(12) United States Patent
Zhou et al.

(10) Patent No.: US 12,526,758 B2
(45) Date of Patent: Jan. 13, 2026

(54) TIMING OFFSET PARAMETER UPDATE METHOD, DEVICE, AND SYSTEM

(71) Applicant: HUAWEI TECHNOLOGIES CO., LTD., Shenzhen (CN)

(72) Inventors: Jianwei Zhou, Hangzhou (CN); Ying Chen, Hangzhou (CN); Xiaolu Wang, Hangzhou (CN); Chenlei Xu, Hangzhou (CN); Hejia Luo, Hangzhou (CN); Yunfei Qiao, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 490 days.

(21) Appl. No.: 18/182,164

(22) Filed: Mar. 10, 2023

(65) Prior Publication Data

US 2023/0217397 A1   Jul. 6, 2023

Related U.S. Application Data

(63) Continuation of application No. PCT/CN2021/101624, filed on Jun. 22, 2021.

(30) Foreign Application Priority Data

Sep. 11, 2020 (CN) .......................... 202010956522.4

(51) Int. Cl.
*H04W 56/00* (2009.01)
(52) U.S. Cl.
CPC .............................. *H04W 56/0045* (2013.01)
(58) Field of Classification Search
CPC ............ H04W 56/0045; H04W 56/005; H04B 7/18513
See application file for complete search history.

(56) References Cited

U.S. PATENT DOCUMENTS

2015/0334707 A1* 11/2015 Rajagopalan ....... H04W 56/004
                                                                370/336
2018/0139747 A1   5/2018 Hosseini et al.
(Continued)

FOREIGN PATENT DOCUMENTS

CN        108886781 A    11/2018

OTHER PUBLICATIONS

"3rd Generation Partnership Project; Technical Specification Group Radio Access Network; NR; Radio Resource Control (RRC) protocol specification (Release 16)," 3GPP TS 38.331 V16.1.0, Total 906 pages, 3rd Generation Partnership Project, Valbonne, France (Jul. 2020).

(Continued)

*Primary Examiner* — Ashley Shivers
(74) *Attorney, Agent, or Firm* — Leydig, Voit & Mayer, Ltd.

(57) ABSTRACT

Embodiments of this application relate to the field of communication technologies, and provide a timing offset parameter update method, a device, and a system, to help reduce signaling overheads when a terminal device updates a value of a timing offset parameter. The method includes: A terminal device obtains a timing advance adjustment variation corresponding to the terminal device, where the timing advance adjustment variation is a difference between a timing advance adjustment amount currently used by the terminal device and a timing advance adjustment amount used at a previous moment. The terminal device determines whether an absolute value of the timing advance adjustment variation is greater than or equal to a first threshold. If the absolute value is greater than or equal to the first threshold, the terminal device sends, to a network device, first indication information used to indicate an update regularity of a timing offset parameter.

20 Claims, 14 Drawing Sheets

(56) References Cited

U.S. PATENT DOCUMENTS

2018/0199296 A1* 7/2018 Peroulas ............ H04W 56/0015
2020/0351855 A1* 11/2020 Kung .................... H04L 1/1896
2021/0314892 A1* 10/2021 Rico Alvarino .. H04W 72/0446

OTHER PUBLICATIONS

Huawei et al., "Discussion on timing relationship enhancements for NTN," 3GPP TSG RAN WG1 Meeting #102-e, R1-2005265, E-meeting, Total 6 pages, 3rd Generation Partnership Project, Valbonne, France (Aug. 17-28, 2020).
Mediatek Inc., "Timing relationship enhancements for NR-NTN," 3GPP TSG RAN WG1 Meeting #102e R1-2005495, Total 6 pages, 3rd Generation Partnership Project, Valbonne, France (Aug. 24-28, 2020).
Fraunhofer IIS et al., "NR-NTN: Timing Relationship Enhancements," 3GPP TSG-RAN WG1 e-Meeting #102, e- Meeting, R1-2005548, Total 8 pages, 3rd Generation Partnership Project, Valbonne, France (Aug. 17-28, 2020).
Sony, "Calculation of timing relationship offsets," 3GPP TSG RAN WG1 #102-e, e-Meeting, R1-2005573, Total 3 pages, 3rd Generation Partnership Project, Valbonne, France (Aug. 17-28, 2020).
CATT, "Timing relationship enhancements," 3GPP TSG RAN WG1 #102-e, e-Meeting, R1-2005706, e-Meeting, Total 3 pages, 3rd Generation Partnership Project, Valbonne, France (Aug. 17-28, 2020).
Lenovo et al.,, "Discussion on NTN timing relationship," 3GPP TSG RAN WG1 #102-e R1-2005833, e-Meeting, Total 3 pages, 3rd Generation Partnership Project, Valbonne, France (Aug. 17-28, 2020).
Intel Corporation, "On timing relationship enhancements for NTN," 3GPP TSG RAN WG1 102-e, R1-2005873, e-Meeting, Total 5 pages, 3rd Generation Partnership Project, Valbonne, France (Aug. 17-28, 2020).
ZTE, Discussion on timing relationship for NTN, 3GPP TSG RAN WG1 #102-e, R1-2005963, e-Meeting, Total 4 pages, 3rd Generation Partnership Project, Valbonne, France (Aug. 17-28, 2020).
Oppo, "Discussion on timing relationship enhancement," 3GPP TSG RAN WG1 #102, R1-2006029, e-Meeting, Total 3 pages, 3rd Generation Partnership Project, Valbonne, France (Aug. 17-28, 2020).
Samsung, "On Timing relationship enhancements," 3GPP TSG RAN WG1 #102-e, R1-2006144, e-Meeting, total 2 pages, 3rd Generation Partnership Project, Valbonne, France (Aug. 17-28, 2020).
CMCC, "Discussion on timing relationship enhancements for NTN," 3GPP TSG RAN WG1 #102-e, R1-2006210, e-Meeting, Total 6 pages, 3rd Generation Partnership Project, Valbonne, France (Aug. 17-28, 2020).
Panasonic, "Timing relationship enhancement for NTN," 3GPP TSG RAN WG1 #102e R1-2006325, E-meeting, Total 4 pages, 3rd Generation Partnership Project, Valbonne, France (Aug. 17-28, 2020).
ETRI, "Discussion on timing relationships for NTN," 3GPP TSG RAN WG1 #102-e, R1-2006358, e-Meeting, Total 3 pages, 3rd Generation Partnership Project, Valbonne, France (Aug. 17-28, 2020).
LG Electronics, "Discussions on timing relationship enhancements in NTN," 3GPP TSG RAN WG1 #102-e R1-2006378, e-Meeting, Total 3 pages, 3rd Generation Partnership Project, Valbonne, France (Aug. 17-28, 2020).
Nokia et al., "DL-UL timing relationship for NTN operation," 3GPP TSG RAN WG1 #102 R1-2006421, e-Meeting, Total 4 pages, 3rd Generation Partnership Project, Valbonne, France (Aug. 17-28, 2020).
Ericsson, "On basic assumptions and timing relationship enhancements for NTN," 3GPP TSG-RAN WG1 Meeting #102-e, R1-2006464, e-Meeting, Total 5 pages, 3rd Generation Partnership Project, Valbonne, France (Aug. 17-28, 2020).
Apple, "On Timing Relationship Enhancement in NTN," 3GPP TSG RAN WG1 #102-e R1-2006519, e-Meeting, Total 2 pages, 3rd Generation Partnership Project, Valbonne, France (Aug. 17-28, 2020).
Xiaomi, "Discussion on the timing relationship for NTN," 3GPP TSG RAN WG1 #102, R1-2006589, e-Meeting, Total 3 pages, 3rd Generation Partnership Project, Valbonne, France (Aug. 17-29, 2020).
Asia Pacific Telecom, "Discussion on timing relationship enhancements for NTN," 3GPP TSG RAN WG1#102-e R1-2006640, e-Meeting, Total 4 pages, 3rd Generation Partnership Project, Valbonne, France (Aug. 17-28, 2020).
Qualcomm Incorporated, "Enhancements on Timing Relationship for NTN," 3GPP TSG RAN WG1 #102-e R1-2006804, e-Meeting, Total 4 pages, 3rd Generation Partnership Project, Valbonne, France (Aug. 17-28, 2020).
Caict, "Timing relationship enhancements to support NTN," 3GPP TSG RAN WG1 Meeting #102-e, R1-2006855, e-Meeting, Total 5 pages, 3rd Generation Partnership Project, Valbonne, France (Aug. 17-28, 2020).

* cited by examiner

TIMING OFFSET PARAMETER UPDATE METHOD, DEVICE, AND SYSTEM

CROSS-REFERENCE TO RELATED APPLICATIONS

This application is a continuation of International Application No. PCT/CN2021/101624, filed on Jun. 22, 2021, which claims priority to Chinese Patent Application No. 202010956522.4, filed on Sep. 11, 2020. The disclosures of the aforementioned applications are hereby incorporated by reference in their entireties.

TECHNICAL FIELD

The present invention relates to the field of communication technologies, and in particular, to a timing offset parameter update method, a device, and a system.

BACKGROUND

In a conventional communication system, a non-terrestrial network (non-terrestrial networks, NTN) is introduced in a place in which no base station can be deployed, for example, sea, desert, or air. A base station or some base station functions are deployed on a flight platform such as a satellite to form a network device, to provide seamless coverage for a terminal device, thereby improving reliability of the communication system.

In the NTN, because a distance between the network device and the terminal device is long, a round trip delay (round trip delay, RTD) corresponding to the terminal device is large. To avoid interference between different terminal devices in a cell, after receiving a downlink signal, the terminal device may send, in advance based on a timing advance (timing advance, TA) adjustment amount, an uplink signal corresponding to the downlink signal. The timing advance adjustment amount is less than or equal to the round trip delay corresponding to the terminal device.

In addition, to avoid that the terminal device cannot send an uplink signal based on the timing advance adjustment amount because a preset delay between a time at which the terminal device receives the downlink signal and a time at which the terminal device feeds back the uplink signal is less than the timing advance adjustment amount, a timing offset parameter is introduced. The network device sends a value of the timing offset parameter to the terminal device, so that after receiving the downlink signal, the terminal device has plenty of time to perform timing advance adjustment based on the preset delay and the value of the timing offset parameter. The value of the timing offset parameter is greater than or equal to the timing advance adjustment amount.

Because the network device in the NTN is mobile, as the network device continuously moves, the distance between the network device and the terminal device continuously changes, and the round trip delay corresponding to the terminal device also continuously changes correspondingly. The terminal device may adjust the timing advance adjustment amount based on the round trip delay corresponding to the terminal device. In addition, the network device may also update the value of the timing offset parameter based on the timing advance adjustment amount reported by the terminal device, to prevent an excessively large value of the timing offset parameter from causing a large scheduling delay corresponding to the terminal device and causing degradation of transmission efficiency.

However, because a value range of the timing advance adjustment amount is large and occupies a large quantity of bits, when the network device updates the value of the timing offset parameter of the terminal device based on the timing advance adjustment amount reported by the terminal device, the terminal device continuously reports the timing advance adjustment amount to the network device, causing high signaling overheads.

SUMMARY

In view of this, an objective of this application is to provide a timing offset parameter update method, a device, and a system, to help reduce signaling overheads generated when a terminal device updates a value of a timing offset parameter.

According to a first aspect, an embodiment of this application provides a timing offset parameter update method. The method includes: A terminal device obtains a timing advance adjustment variation corresponding to the terminal device, where the timing advance adjustment variation is a difference between a timing advance adjustment amount currently used by the terminal device and a timing advance adjustment amount used at a previous moment. The terminal device determines whether an absolute value of the timing advance adjustment variation is greater than or equal to a first threshold. If the absolute value is greater than or equal to the first threshold, the terminal device sends, to a network device, first indication information used to indicate an update regularity of a timing offset parameter.

According to the first aspect, compared with a case in which the terminal device continuously reports the timing advance adjustment amount to the network device so that the network device updates the value of the timing offset parameter, in this embodiment of this application, the terminal device reports the first indication information to the network device to indicate the network device to update the value of the timing offset parameter. This can reduce signaling overheads of the terminal device when the network device is indicated to update the value of the timing offset parameter.

In a possible design, the terminal device sends the first indication information to the network device through a physical uplink control channel PUCCH; or the terminal device sends the first indication information to the network device through a physical uplink shared channel PUSCH; or the terminal device includes the first indication information in MAC CE signaling, and sends the MAC CE signaling to the network device.

According to this possible design, the terminal device may send the first indication information to the network device through the PUCCH, the PUSCH, the MAC CE signaling, or the like. This is not limited. This provides a feasible solution for the terminal device to send the first indication information to the network device.

In a possible design, the update regularity is increasing a value of the timing offset parameter or decreasing a value of the timing offset parameter.

According to this possible design, when a timing advance adjustment amount corresponding to the terminal device decreases, the terminal device may send, to the network device, first indication information for decreasing the value of the timing offset parameter; or when a timing advance adjustment amount corresponding to the terminal device increases, the terminal device may send, to the network device, first indication information for increasing the value of the timing offset parameter, so that the network device updates the value of the timing offset parameter according to the update regularity indicated in the first indication information.

In a possible design, the terminal device receives a first index number from the network device; the terminal device determines, from a correspondence between an index number and a value of the timing offset parameter based on the first index number, a value that is of the timing offset parameter and that corresponds to the first index number; and the terminal device updates the value of the timing offset parameter to the value that is of the timing offset parameter and that corresponds to the first index number.

According to this possible design, the network device sends the first index number to the terminal device to indicate the updated value of the timing offset parameter, so that signaling overheads generated when the network device updates the value of the timing offset parameter corresponding to the terminal device can be reduced.

In a possible design, the terminal device sends a random access preamble sequence to the network device; the terminal device receives, from the network device, a second index number determined based on the random access preamble sequence; and the terminal device determines, based on the correspondence between an index number and a value of the timing offset parameter, a value that is of the timing offset parameter and that corresponds to the second index number as an initial value of the timing offset parameter.

According to this possible design, the terminal device may send the random access preamble sequence to the network device in a random access process, so that the network device determines the initial value of the timing offset parameter based on the random access preamble sequence.

In a possible design, the terminal device sends a random access preamble sequence to the network device based on a first timing compensation value; the terminal device receives a random access response from the network device; and the terminal device determines a first timing advance adjustment amount based on the first timing compensation value and the random access response.

According to this possible design, the terminal device may perform self-compensation in a random access process, that is, send the random access preamble sequence in advance based on the first timing compensation value, and determine the first timing advance adjustment amount based on the random access response.

In a possible design, the terminal device sends the first timing advance adjustment amount to the network device; the terminal device receives, from the network device, a second index number determined based on the first timing advance adjustment amount; and the terminal device determines, based on the correspondence between an index number and a value of the timing offset parameter, a value that is of the timing offset parameter and that corresponds to the second index number as an initial value of the timing offset parameter.

In a possible design, the terminal device receives a common timing advance adjustment amount from the network device, where the common timing advance adjustment amount is a timing advance adjustment amount corresponding to a reference point; and the terminal device determines an initial value of the timing offset parameter based on the first timing advance adjustment amount and the common timing advance adjustment amount.

According to the foregoing two possible designs, the terminal device may send the first timing advance adjustment amount to the network device, so that the network device determines the initial value of the timing offset parameter based on the first timing advance adjustment amount and the common timing advance adjustment amount; or may receive the common timing advance adjustment amount sent by the network device, and determine the initial value of the timing offset parameter. This is not limited.

According to a second aspect, an embodiment of this application provides a terminal device. The terminal device may implement the functions performed by the terminal device in the first aspect or the possible designs of the first aspect, and the functions may be implemented by hardware executing corresponding software. The hardware or the software includes one or more modules corresponding to the functions, for example, a transceiver module and a processing module. The processing module is configured to obtain a timing advance adjustment variation corresponding to the terminal device, where the timing advance adjustment variation is a difference between a timing advance adjustment amount currently used by the terminal device and a timing advance adjustment amount used at a previous moment. The processing module is further configured to determine whether an absolute value of the timing advance adjustment variation is greater than or equal to a first threshold. The transceiver module is configured to: if the absolute value is greater than or equal to the first threshold, send, to a network device, first indication information used to indicate an update regularity of a timing offset parameter.

For a specific implementation of the terminal device, refer to the behavior and the functions of the terminal device in the timing offset parameter update method provided in any one of the first aspect or the possible designs of the first aspect. According to the terminal device described in the second aspect, compared with a case in which the terminal device continuously reports the timing advance adjustment amount to the network device so that the network device updates the value of the timing offset parameter, in this embodiment of this application, the terminal device reports the first indication information to the network device to indicate the network device to update the value of the timing offset parameter. This can reduce signaling overheads of the terminal device when the network device is indicated to update the value of the timing offset parameter.

In a possible design, the transceiver module is further configured to send the first indication information to the network device through a physical uplink control channel PUCCH; or send the first indication information to the network device through a physical uplink shared channel PUSCH; or include the first indication information in MAC CE signaling, and send the MAC CE signaling to the network device.

According to this possible design, the terminal device may send the first indication information to the network device through the PUCCH, the PUSCH, the MAC CE signaling, or the like. This is not limited. This provides a feasible solution for the terminal device to send the first indication information to the network device.

In a possible design, the update regularity is increasing a value of the timing offset parameter or decreasing a value of the timing offset parameter.

According to this possible design, when a timing advance adjustment amount corresponding to the terminal device decreases, the terminal device may send, to the network device, first indication information for decreasing the value of the timing offset parameter; or when a timing advance adjustment amount corresponding to the terminal device increases, the terminal device may send, to the network device, first indication information for increasing the value of the timing offset parameter, so that the network device updates the value of the timing offset parameter according to the update regularity indicated in the first indication information.

In a possible design, the transceiver module is further configured to receive a first index number from the network device; the processing module is further configured to determine, from a correspondence between an index number and a value of the timing offset parameter based on the first index number, a value that is of the timing offset parameter and that corresponds to the first index number; and the processing module is further configured to update the value of the timing offset parameter to the value that is of the timing offset parameter and that corresponds to the first index number.

According to this possible design, the network device sends the first index number to the terminal device to indicate the updated value of the timing offset parameter, so that signaling overheads generated when the network device updates the value of the timing offset parameter corresponding to the terminal device can be reduced.

In a possible design, the transceiver module is further configured to send a random access preamble sequence to the network device, and receive, from the network device, a second index number determined based on the random access preamble sequence; and the processing module is further configured to determine, based on the correspondence between an index number and a value of the timing offset parameter, a value that is of the timing offset parameter and that corresponds to the second index number as an initial value of the timing offset parameter.

According to this possible design, the terminal device may send the random access preamble sequence to the network device in a random access process, so that the network device determines the initial value of the timing offset parameter based on the random access preamble sequence.

In a possible design, the transceiver module is further configured to send a random access preamble sequence to the network device based on a first timing compensation value, and receive a random access response from the network device; and the processing module is further configured to determine a first timing advance adjustment amount based on the first timing compensation value and the random access response.

According to this possible design, the terminal device may perform self-compensation in a random access process, that is, send the random access preamble sequence in advance based on the first timing compensation value, and determine the first timing advance adjustment amount based on the random access response.

In a possible design, the transceiver module is further configured to send the first timing advance adjustment amount to the network device, and receive, from the network device, a second index number determined based on the first timing advance adjustment amount; and the processing module is further configured to determine, based on the correspondence between an index number and a value of the timing offset parameter, a value that is of the timing offset parameter and that corresponds to the second index number as an initial value of the timing offset parameter.

In a possible design, the transceiver module is further configured to receive a common timing advance adjustment amount from the network device, where the common timing advance adjustment amount is a timing advance adjustment amount corresponding to a reference point; and the terminal device determines an initial value of the timing offset parameter based on the first timing advance adjustment amount and the common timing advance adjustment amount.

According to the foregoing two possible designs, the terminal device may send the first timing advance adjustment amount to the network device, so that the network device determines the initial value of the timing offset parameter based on the first timing advance adjustment amount and the common timing advance adjustment amount; or may receive the common timing advance adjustment amount sent by the network device, and determine the initial value of the timing offset parameter. This is not limited.

According to a third aspect, an embodiment of this application provides a terminal device. The terminal device may be a terminal device, a chip in a terminal device, or a system-on-a-chip. The terminal device may implement the functions performed by the terminal device in the foregoing aspects or possible designs, and the functions may be implemented by hardware. In a possible design, the terminal device may include a transceiver and a processor. The transceiver and the processor may be configured to support the terminal device in implementing the functions in any one of the first aspect or the possible designs of the first aspect. For example, the processor may be configured to obtain a timing advance adjustment variation corresponding to the terminal device, where the timing advance adjustment variation is a difference between a timing advance adjustment amount currently used by the terminal device and a timing advance adjustment amount used at a previous moment; the processor may be further configured to determine whether an absolute value of the timing advance adjustment variation is greater than or equal to a first threshold; and the transceiver may be configured to: if the absolute value is greater than or equal to the first threshold, send, to a network device, first indication information used to indicate an update regularity of a timing offset parameter. In another possible design, the terminal device may further include a memory. The memory is configured to store computer-executable instructions and data that are necessary for the terminal device. When the terminal device runs, the transceiver and the processor execute the computer-executable instructions stored in the memory, so that the terminal device performs the timing offset parameter update method according to any one of the first aspect or the possible designs of the first aspect.

For a specific implementation of the terminal device, refer to the behavior and the functions of the terminal device in the timing offset parameter update method provided in any one of the first aspect or the possible designs of the first aspect.

According to a fourth aspect, an embodiment of this application provides a timing offset parameter update method. The method includes: A network device obtains first indication information used to indicate an update regularity of a timing offset parameter corresponding to a terminal device. The network device updates a value of the timing offset parameter based on the first indication information. The network device sends an updated value of the timing offset parameter to the terminal device.

According to the fourth aspect, compared with a case in which the network device continuously receives the timing advance adjustment amount reported by the terminal device to update the value of the timing offset parameter, in this embodiment of this application, the network device can update the value of the timing offset parameter based on the first indication information sent by the terminal device, thereby reducing signaling overheads of the terminal device.

In a possible design, the network device receives the first indication information from the terminal device through a physical uplink control channel PUCCH; or the network device receives the first indication information from the terminal device through a physical uplink shared channel PUSCH; or the network device receives, from the terminal device, MAC CE signaling that carries the first indication information.

According to this possible design, the network device may receive the first indication information sent by the terminal device through the PUCCH, the PUSCH, the MAC CE signaling, or the like. This is not limited. This provides a feasible solution for the network device to receive the first indication information sent by the terminal device.

In a possible design, the network device determines whether an absolute value of a timing offset variation corresponding to the terminal device is greater than or equal to a second threshold, where the timing offset variation is a difference between a value that is of the timing offset parameter and that is currently used by the terminal device and the updated value of the timing offset parameter; and if the absolute value is greater than or equal to the second threshold, the network device sends the updated value of the timing offset parameter to the terminal device.

According to this possible design, when the absolute value of the timing offset variation corresponding to the terminal device is greater than or equal to the second threshold, the network device may update the value of the timing offset parameter corresponding to the terminal device. This prevents the network device from frequently updating the value of the timing offset parameter corresponding to the terminal device and sending an updated value to the terminal device, thereby reducing signaling overheads of the network device.

In a possible design, the network device determines, from a correspondence between an index number and a value of the timing offset parameter based on the updated value of the timing offset parameter, a first index number corresponding to the updated value of the timing offset parameter; and the network device sends the first index number to the terminal device.

According to this possible design, the network device sends the first index number to the terminal device to indicate the updated value of the timing offset parameter, so that signaling overheads generated when the network device updates the value of the timing offset parameter corresponding to the terminal device can be reduced.

In a possible design, the network device determines a maximum value and a minimum value of the timing offset parameter that correspond to an area in which the terminal device is located, where the area is a coverage area of a beam, a cell, or a satellite; the network device quantizes, based on a preset granularity, a value that is of the timing offset parameter and that corresponds to the area; and the network device determines, based on a quantized value of the timing offset parameter, an index number corresponding to the value of the timing offset parameter, and stores a correspondence between the index number and the value of the timing offset parameter.

According to this possible design, the network device quantizes the value that is of the timing offset parameter and that corresponds to the area, and indicates the value of the timing offset parameter to the terminal device in the form of the index number. This can reduce signaling overheads generated when the network device sends the value of the timing offset parameter to the terminal.

In a possible design, the network device receives a random access preamble sequence from the terminal device; the network device determines a second timing advance adjustment amount based on the random access preamble sequence; the network device determines, based on the second timing advance adjustment amount and a common timing advance adjustment amount, an initial value of the timing offset parameter corresponding to the terminal device, where the common timing advance adjustment amount is a timing advance adjustment amount corresponding to a reference point; and the network device sends, to the terminal device based on the correspondence between an index number and a value of the timing offset parameter, a second index number corresponding to the initial value of the timing offset parameter.

According to this possible design, the network device may determine the initial value of the timing offset parameter based on the random access preamble sequence sent by the terminal device in a random access process, and send the initial value to the terminal device. This provides a feasible solution for the network device and the terminal device to determine the initial value of the timing offset parameter.

In a possible design, the network device receives a random access preamble sequence from the terminal device, and the network device sends a random access response to the terminal device based on the random access preamble sequence.

In a possible design, the network device receives a first timing advance adjustment amount from the terminal device; the network device determines, based on the first timing advance adjustment amount and a common timing advance adjustment amount, an initial value of the timing offset parameter corresponding to the terminal device, where the common timing advance adjustment amount is a timing advance adjustment amount corresponding to a reference point; and the network device sends, to the terminal device based on the correspondence between an index number and a value of the timing offset parameter, a second index number corresponding to the initial value of the timing offset parameter.

In a possible design, the network device sends a common timing advance adjustment amount to the terminal device, where the common timing advance adjustment amount is a timing advance adjustment amount corresponding to a reference point.

According to the foregoing three possible designs, the network device may determine the initial value of the timing offset parameter based on the first timing advance adjustment amount and the common timing advance adjustment amount, and send the initial value to the terminal device; or may send the common timing advance adjustment amount to the terminal device, so that the terminal device determines the initial value of the timing offset parameter based on the first timing advance adjustment amount and the common timing advance adjustment amount.

According to a fifth aspect, an embodiment of this application provides a network device. The network device may implement the functions performed by the network device in the fourth aspect or the possible designs of the fourth aspect, and the functions may be implemented by hardware executing corresponding software. The hardware or the software includes one or more modules corresponding to the functions, for example, a transceiver module and a processing module. The transceiver module is configured to obtain first indication information used to indicate an update regularity of a timing offset parameter corresponding to a terminal device. The processing module is configured to update a value of the timing offset parameter based on the first indication information. The transceiver module is configured to send an updated value of the timing offset parameter to the terminal device.

For a specific implementation of the network device, refer to the behavior and the functions of the network device in the timing offset parameter update method provided in any one of the fourth aspect or the possible designs of the fourth aspect. According to the network device in the fifth aspect, compared with a case in which the network device continuously receives the timing advance adjustment amount reported by the terminal device to update the value of the timing offset parameter, in this embodiment of this application, the network device can update the value of the timing offset parameter based on the first indication information sent by the terminal device, thereby reducing signaling overheads of the terminal device.

In a possible design, the transceiver module is configured to receive the first indication information from the terminal device through a physical uplink control channel PUCCH; or receive the first indication information from the terminal device through a physical uplink shared channel PUSCH; or receive, from the terminal device, MAC CE signaling that carries the first indication information.

According to this possible design, the network device may receive the first indication information sent by the terminal device through the PUCCH, the PUSCH, the MAC CE signaling, or the like. This is not limited. This provides a feasible solution for the network device to receive the first indication information sent by the terminal device.

In a possible design, the processing module is configured to determine whether an absolute value of a timing offset variation corresponding to the terminal device is greater than or equal to a second threshold, where the timing offset variation is a difference between a value that is of the timing offset parameter and that is currently used by the terminal device and the updated value of the timing offset parameter; and the transceiver module is configured to: if the absolute value is greater than or equal to the second threshold, send the updated value of the timing offset parameter to the terminal device.

According to this possible design, when the absolute value of the timing offset variation corresponding to the terminal device is greater than or equal to the second threshold, the network device may update the value of the timing offset parameter corresponding to the terminal device. This prevents the network device from frequently updating the value of the timing offset parameter corresponding to the terminal device and sending an updated value to the terminal device, thereby reducing signaling overheads of the network device.

In a possible design, the processing module is configured to determine, from a correspondence between an index number and a value of the timing offset parameter based on the updated value of the timing offset parameter, a first index number corresponding to the updated value of the timing offset parameter; and the transceiver module is configured to send the first index number to the terminal device.

According to this possible design, the network device sends the first index number to the terminal device to indicate the updated value of the timing offset parameter, so that signaling overheads generated when the network device updates the value of the timing offset parameter corresponding to the terminal device can be reduced.

In a possible design, the processing module is configured to determine a maximum value and a minimum value of the timing offset parameter that correspond to an area in which the terminal device is located, where the area is a coverage area of a beam, a cell, or a satellite; the processing module is configured to quantize, based on a preset granularity, a value that is of the timing offset parameter and that corresponds to the area; and the processing module is configured to determine, based on a quantized value of the timing offset parameter, an index number corresponding to the value of the timing offset parameter, and stores a correspondence between the index number and the value of the timing offset parameter.

According to this possible design, the network device quantizes the value that is of the timing offset parameter and that corresponds to the area, and indicates the value of the timing offset parameter to the terminal device in the form of the index number. This can reduce signaling overheads generated when the network device sends the value of the timing offset parameter to the terminal.

In a possible design, the transceiver module is configured to receive a random access preamble sequence from the terminal device; the processing module is configured to determine a second timing advance adjustment amount based on the random access preamble sequence; the processing module is configured to determine, based on the second timing advance adjustment amount and a common timing advance adjustment amount, an initial value of the timing offset parameter corresponding to the terminal device, where the common timing advance adjustment amount is a timing advance adjustment amount corresponding to a reference point; and the transceiver module is configured to send, to the terminal device based on the correspondence between an index number and a value of the timing offset parameter, a second index number corresponding to the initial value of the timing offset parameter.

According to this possible design, the network device may determine the initial value of the timing offset parameter based on the random access preamble sequence sent by the terminal device in a random access process, and send the initial value to the terminal device. This provides a feasible solution for the network device and the terminal device to determine the initial value of the timing offset parameter.

In a possible design, the transceiver module is configured to receive a random access preamble sequence from a terminal device, and send a random access response to the terminal device based on the random access preamble sequence.

In a possible design, the transceiver module is configured to receive a first timing advance adjustment amount from the terminal device; the processing module is configured to determine, based on the first timing advance adjustment amount and a common timing advance adjustment amount, an initial value of the timing offset parameter corresponding to the terminal device, where the common timing advance adjustment amount is a timing advance adjustment amount corresponding to a reference point; and the transceiver module is configured to send, to the terminal device based on the correspondence between an index number and a value of the timing offset parameter, a second index number corresponding to the initial value of the timing offset parameter.

In a possible design, the transceiver module is configured to send a common timing advance adjustment amount to the terminal device, where the common timing advance adjustment amount is a timing advance adjustment amount corresponding to a reference point.

According to the foregoing three possible designs, the network device may determine the initial value of the timing offset parameter based on the first timing advance adjustment amount and the common timing advance adjustment amount, and send the initial value to the terminal device; or may send the common timing advance adjustment amount to the terminal device, so that the terminal device determines the initial value of the timing offset parameter based on the first timing advance adjustment amount and the common timing advance adjustment amount.

According to a sixth aspect, an embodiment of this application provides a network device. The network device may be a network device, a chip in a network device, or a system-on-a-chip. The network device may implement the functions performed by the network device in the foregoing aspects or possible designs, and the functions may be implemented by hardware. In a possible design, the network device may include a processor and a transceiver. The processor and the transceiver may be configured to support the network device in implementing the functions in any one of the fourth aspect or the possible designs of the fourth aspect. For example, the transceiver may be configured to obtain first indication information used to indicate an update regularity of a timing offset parameter corresponding to a terminal device; the processor may be configured to update a value of the timing offset parameter based on the first indication information; and the transceiver may be configured to send an updated value of the timing offset parameter to the terminal device. In another possible design, the network device may further include the processor and a memory. The memory is configured to store computer-executable instructions and data that are necessary for the network device. When the network device runs, the transceiver and the processor execute the computer-executable instructions stored in the memory, so that the network device performs the timing offset parameter update method according to any one of the fourth aspect or the possible designs of the fourth aspect.

For a specific implementation of the network device, refer to the behavior and the functions of the network device in the timing offset parameter update method provided in any one of the fourth aspect or the possible designs of the fourth aspect.

According to a seventh aspect, a communication apparatus is provided. The communication apparatus includes one or more processors and one or more memories. The one or more memories are coupled to the one or more processors, and the one or more memories are configured to store computer program code or computer instructions. When the one or more processors execute the computer instructions, the communication apparatus is enabled to perform the timing offset parameter update method according to any one of the first aspect or the possible designs of the first aspect, or perform the timing offset parameter update method according to any one of the fourth aspect or the possible designs of the fourth aspect.

According to an eighth aspect, a computer-readable storage medium is provided. The computer-readable storage medium stores computer instructions or a computer program. When the computer instructions or the computer program runs on a computer, the computer is enabled to perform the timing offset parameter update method according to any one of the first aspect or the possible designs of the first aspect, or perform the timing offset parameter update method according to any one of the fourth aspect or the possible designs of the fourth aspect.

According to a ninth aspect, a computer program product including instructions is provided. When the computer program product runs on a computer, the computer is enabled to perform the timing offset parameter update method according to any one of the first aspect or the possible designs of the first aspect, or perform the timing offset parameter update method according to any one of the fourth aspect or the possible designs of the fourth aspect.

According to a tenth aspect, a chip is provided. The chip includes a logic circuit and an input/output interface. The logic circuit is configured to read instructions, so that the chip performs the timing offset parameter update method according to any one of the first aspect or the possible designs of the first aspect, or performs the timing offset parameter update method according to any one of the fourth aspect or the possible designs of the fourth aspect.

For a technical effect of any design manner in the seventh aspect to the tenth aspect, refer to a technical effect of any possible design of the first aspect and the second aspect, or refer to a technical effect of any possible design of the fourth aspect and the fifth aspect. Details are not described again.

According to an eleventh aspect, a communication system is provided. The communication system includes the terminal device according to any one of the second aspect and the third aspect and the network device according to any one of the fifth aspect and the sixth aspect.

DESCRIPTION OF EMBODIMENTS

Figure 1A:
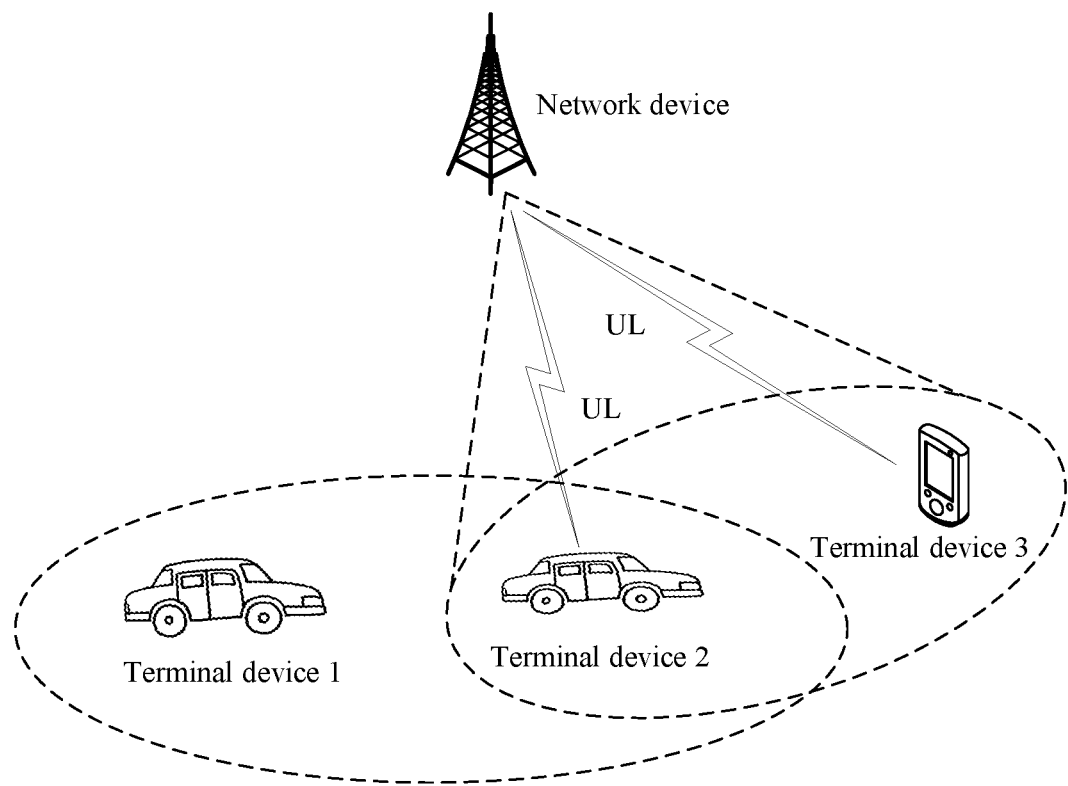
FIG. 1a is a schematic diagram of a communication system according to an embodiment of this application.

Before embodiments of this application are described, technical terms used in embodiments of this application are described.

A beam is a shape formed on the Earth's surface by an electromagnetic wave transmitted by a satellite antenna.

A cell is an area in which a communication service can be provided for a terminal device. Specifically, in a communication system, sectors corresponding to a network device may be divided into different cells based on different carriers.

A preset delay may be a preset delay between a time at which a terminal device receives a downlink signal sent by a network device and a time at which the terminal device feeds back, to the network device, an uplink signal corresponding to the downlink signal.

Example 1: Assuming that the terminal device receives, in a downlink slot n, physical downlink shared channel (physical downlink shared channel, PDSCH) data or semi-persistent scheduling (semi-persistent scheduling, SPS) PDSCH data sent by the network device by using downlink control information (downlink control information, DCI), the terminal device may feed back, to the network device in a slot n+k1 of a physical uplink control channel (physical uplink control channel, PUCCH), a hybrid automatic repeat request acknowledgement (hybrid automatic repeat request acknowledgement, HARQ-ACK) indicator or a NACK indicator corresponding to the PDSCH data.

k1 is the preset delay, and k1≤15. Specifically, the terminal device may determine k1 based on a PDSCH-to-HARQ timing indicator (PDSCH-to-HARQ-timing-indicator) index table in the DCI, and the network device may send the index table to the terminal device by using downlink data to uplink acknowledgement (downlink data to uplink acknowledgement, DL-data to UL-ACK) signaling.

Example 2: Assuming that the terminal device receives, in a downlink slot n, uplink grant/scheduling information sent by the network device by using DCI, the terminal device may feed back physical uplink shared channel (physical uplink shared channel, PUSCH) data to the network device in a slot $$\left\lfloor n \cdot \frac{2^{\mu PUSCH}}{2^{\mu PDCCH}} \right\rfloor + k2$$

of a PUCCH.

k2 slot lengths are the preset delay. μPUSCH is related to a subcarrier spacing of a PUSCH, that is, the subcarrier spacing of the PUSCH is $2^{\mu PUSCH}*15$ KHz. μPDCCH; is related to a subcarrier spacing of a PDCCH, that is, the subcarrier spacing of the PDCCH is $2^{\mu PDCCH}*15$ KHz. k2=0, . . . , 32. Specifically, the network device may indicate a specific value of k2 to the terminal device by using the DCI.

The following describes implementations of embodiments of this application in detail with reference to accompanying drawings in this specification.

A timing offset parameter update method provided in embodiments of this application may be applied to any communication system. The communication system may be a third generation partnership project (third generation partnership project, 3GPP) communication system, for example, a long term evolution (long term evolution, LTE) system; or may be a fifth generation (fifth generation, 5G) mobile communication system, a new radio (new radio, NR) system, or an NR V2X system; or may be an LTE and 5G hybrid network system, a device-to-device (device, D2D) communication system, a machine-to-machine (machine to machine, M2M) communication system, the internet of things (internet of things, IoT), or another next-generation communication system; or may be a non-3GPP communication system. This is not limited.

The timing offset parameter update method provided in embodiments of this application may be applied to a communication scenario in which a distance between a terminal device and a network device constantly changes.

FIG. 1a is used as an example below to describe the timing offset parameter update method provided in embodiments of this application.

FIG. 1a is a schematic diagram of a communication system according to an embodiment of this application. As shown in FIG. 1a, the communication system may be a non-terrestrial network (non-terrestrial networks, NTN) communication system, and the NTN communication system may include at least one terminal device and at least one network device.

The terminal device in FIG. 1a may be located in a beam/cell coverage area of the network device. The terminal device may communicate with the network device in uplink (uplink, UL) or downlink (downlink, DL) through an air interface. For example, the terminal may send uplink data to the network device in an UL direction through a physical uplink shared channel (physical uplink shared channel, PUSCH), and the network device may send downlink data to the terminal device in a DL direction through a physical downlink shared channel (physical downlink shared channel, PDSCH).

The terminal (terminal) device in FIG. 1a may be referred to as user equipment (user equipment, UE), a mobile station (mobile station, MS), a mobile terminal (mobile terminal, MT), or the like. Specifically, the terminal device in FIG. 1a may be a mobile phone (mobile phone), a tablet computer, or a computer with a wireless transceiver function. Alternatively, the terminal device may be a virtual reality (virtual reality, VR) terminal, an augmented reality (augmented reality, AR) terminal, a wireless terminal in industrial control, a wireless terminal in self-driving, a wireless terminal in telemedicine, a wireless terminal in a smart grid, a wireless terminal in a smart city (smart city), a wireless terminal in a smart home (smart home), a vehicle-mounted terminal, a vehicle with a vehicle-to-vehicle (vehicle-to-vehicle, V2V) communication capability, an intelligent connected vehicle, an uncrewed aerial vehicle with a UAV-to-UAV (UAV to UAV, U2U) communication capability, or the like. This is not limited.

The network device in FIG. 1a may include an access network device and a flight platform. The access network device may be mounted on the flight platform, or the access network device may be mounted on the flight platform in a distributed manner based on a distributed unit (distributed unit, DU), or the access network device may be disposed on the ground. The terminal device and the access network device may communicate with each other through signal forwarding by the flight platform.

Figure 1B:
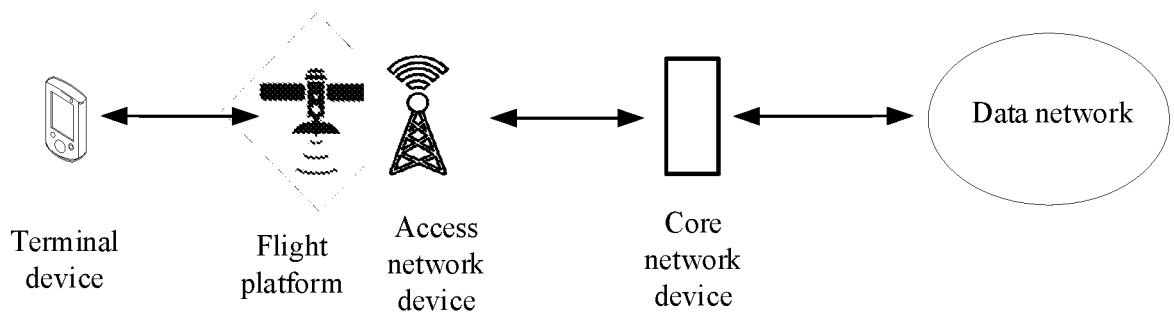
FIG. 1b is a schematic diagram of a communication architecture of a communication system according to an embodiment of this application.

For example, as shown in FIG. 1b, when the access network device is mounted on the flight platform, the communication system shown in FIG. 1a may have a communication architecture shown in FIG. 1b. As shown in FIG. 1b, the access network device moves synchronously with the flight platform, and the access network device and the flight platform may be considered as a whole. In this case, the flight platform may be considered as the access network device, or may be described as that the flight platform operates in a regenerative (regenerative) mode, that is, the flight platform has a function of the access network device. In addition, a communication link between the flight platform and the terminal device may be referred to as a service link (service link).

Figure 1C:
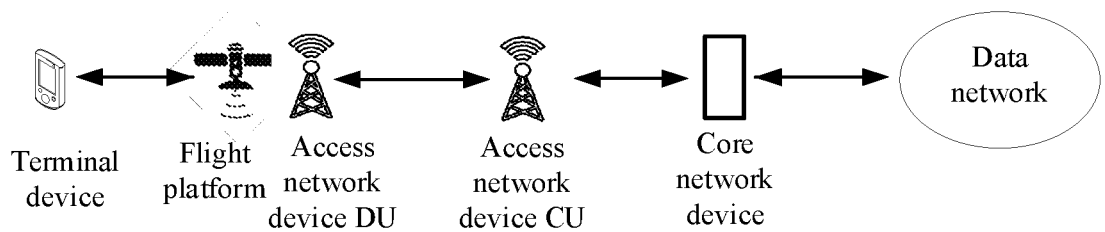
FIG. 1c is a schematic diagram of a communication architecture of a communication system according to an embodiment of this application.

As shown in FIG. 1c, when the access network device is mounted on the flight platform in a distributed manner based on the DU, the communication system shown in FIG. 1a may have a communication architecture shown in FIG. 1c. As shown in FIG. 1c, the access network device may include an access network device DU and an access network device central unit (central unit, CU). The access network device DU may be mounted on the flight platform, and the access network device CU may be disposed on the ground. The terminal device may establish a communication connection to the access network device CU by using the access network device DU. In this case, the flight platform may be considered as a part of the access network device, or may be described as that the flight platform operates in a regenerative mode, that is, the flight platform has some functions of the access network device. In addition, a communication link between the flight platform and the terminal device may be referred to as a service link, and a communication link between the flight platform and the access network device CU may be referred to as a feeder link (feeder link). It should be noted that the communication architecture in FIG. 1c may be considered as a special example of the communication architecture shown in FIG. 1b. In FIG. 1c, the access network device CU may also be described as a gateway (gateway), a terrestrial station, or the like. This is not limited.

Figure 1D:
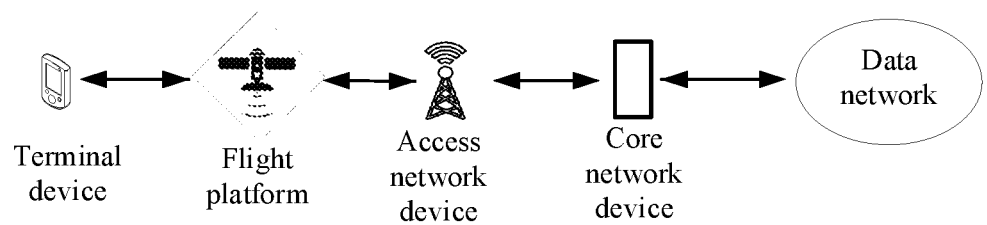
FIG. 1d is a schematic diagram of a communication architecture of a communication system according to an embodiment of this application.

As shown in FIG. 1d, when the access network device is disposed on the ground, the communication system shown in FIG. 1a may have a communication architecture shown in FIG. 1d. As shown in FIG. 1d, the terminal device and the access network device may communicate with each other through signal forwarding by the flight platform. Specifically, the flight platform may provide a wireless access transmission/reception point (transmission/reception point, TRP) for the terminal device. The TRP may transparently transmit data between the terminal device and the access network device, to implement a communication connection between the terminal device and the access network device. This may be described as that the flight platform operates in a transparent (transparent) mode. In addition, a communication link between the flight platform and the terminal device may be referred to as a service link, and a communication link between the flight platform and the access network device may be referred to as a feeder link. It should be noted that the access network device may also be described as a gateway, a terrestrial station, or the like. This is not limited.

The access network device may be any device with a wireless transceiver function, and is mainly configured to implement functions such as a wireless physical control function, resource scheduling and radio resource management, radio access control, and mobility management. Specifically, the network device may be a device supporting wired access, or may be a device supporting wireless access. For example, the network device may be an access network (access network, AN)/radio access network (radio access network, RAN) device, and includes a plurality of 5G-AN/5G-RAN nodes. A 5G-AN/5G-RAN node may be an access point (access point, AP), a NodeB (NodeB, NB), an enhanced NodeB (enhanced NodeB, eNB), a next-generation NodeB (NR NodeB, gNB), a transmission/reception point (transmission reception point, TRP), a transmission point (transmission point, TP), another access node, or the like.

The flight platform may be a flight vehicle such as a satellite or an uncrewed aerial vehicle. For example, based on a height of the flight platform, the flight platform may include a low earth orbit satellite, a medium earth orbit satellite, a geostationary earth orbit satellite, an uncrewed flight system platform, or a high earth orbit satellite.

Alternatively, the communication system in FIG. 1a may be an air-to-ground (air to ground, ATG) communication system, and the ATG communication system may include at least one terminal device and at least one network device.

Figure 1E:
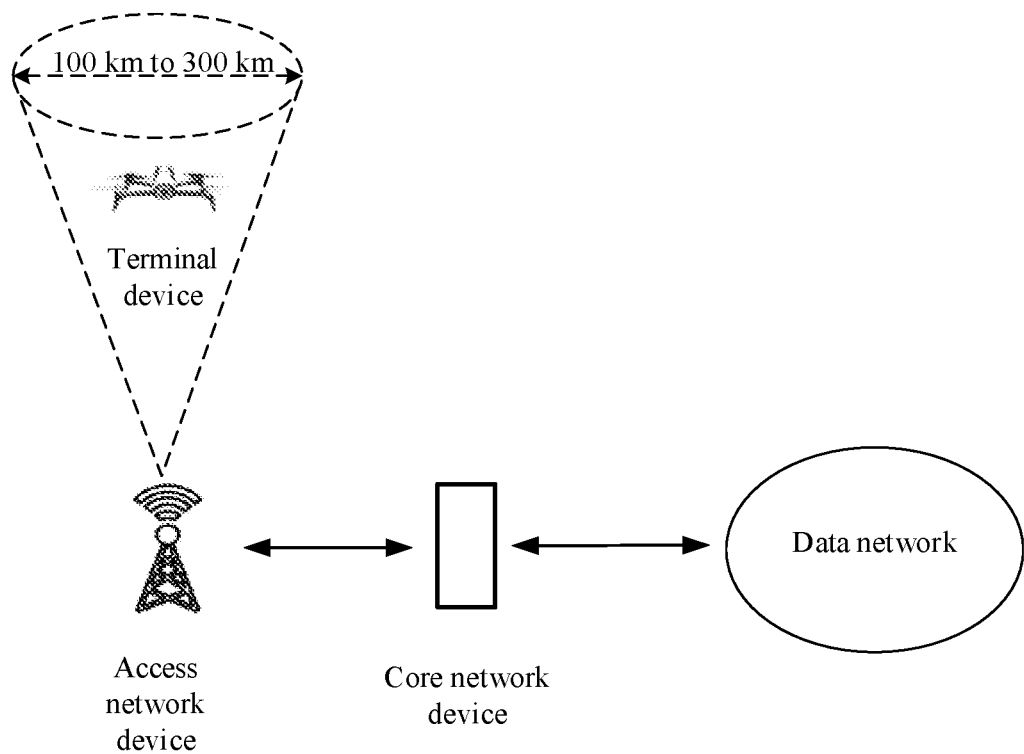
FIG. 1e is a schematic diagram of a communication architecture of a communication system according to an embodiment of this application.

Specifically, as shown in FIG. 1e, the terminal device may continuously move at a high altitude (for example, 6 km to 12 km), the network device may be an access network device disposed on the ground, and the access network device may transmit a wireless network signal to the air, to provide a communication service for a terminal device located in a beam/cell corresponding to the access network device. The terminal device may be a device that can move at a high altitude, for example, an uncrewed aerial vehicle or an airplane. For example, a diameter of the beam/cell corresponding to the access network device may be 100 km to 300 km.

In addition, in FIG. 1b to FIG. 1e, the communication system may further include a core network device and a data network (data network, DN), and the terminal device may communicate with the data network by using the network device and the core network device.

The core network device may be configured to send, to the data network, data of the terminal device that is sent by the network device. Specifically, the core network device may include network elements such as a mobility management network element, a session management network element, a policy control network element, a user plane network element, and an application function network element. This is not limited.

The data network may be an operator network that provides a data transmission service for the terminal device, for example, may be an operator network that provides an IP multimedia service (IP multi-media service, IMS) for the terminal device. An application server (application server, AS) may be deployed in the DN, and the application server may provide a data transmission service for the terminal device.

Compared with a distance between a network device and a terminal device in a terrestrial network (terrestrial networks, TN) communication system, a distance between a network device and a terminal device in an NTN communication system is larger (usually greater than 500 km). As a result, round trip delays corresponding to terminal devices in a same beam/cell in the NTN communication system and a difference between the round trip delays corresponding to the terminal devices are far greater than round trip delays corresponding to terminal devices in a same cell in the TN communication system and a difference between the round trip delays corresponding to the terminal devices.

A round trip delay (round trip delay, RTD) corresponding to a terminal device may be a sum of transmission duration for sending a signal by the network device to the terminal device and transmission duration for sending a signal by the terminal device to the network device, or may be described as a quotient of twice a distance between the network device and the terminal device and a signal transmission speed. This is not limited. Specifically, the signal transmission speed may be a speed of light.

Specifically, when the communication system is the communication system shown in FIG. 1b, the round trip delay corresponding to the terminal device may be a quotient of twice a distance between the terminal device and the flight platform and the signal transmission speed; when the communication system is the communication system shown in FIG. 1c, the round trip delay corresponding to the terminal device may be a sum of a quotient of twice a distance between the terminal device and the flight platform and the signal transmission speed and a quotient of twice a distance between the flight platform and the access network device CU and the signal transmission speed; when the communication system is the communication system shown in FIG. 1d, the round trip delay corresponding to the terminal device may be a sum of a quotient of twice a distance between the terminal device and the flight platform and the signal transmission speed and a quotient of twice a distance between the flight platform and the access network device and the signal transmission speed; or when the communication system is the communication system shown in FIG. 1e, the round trip delay corresponding to the terminal device may be a quotient of twice a distance between the terminal device and the access network device and the signal transmission speed.

Figure 1F:
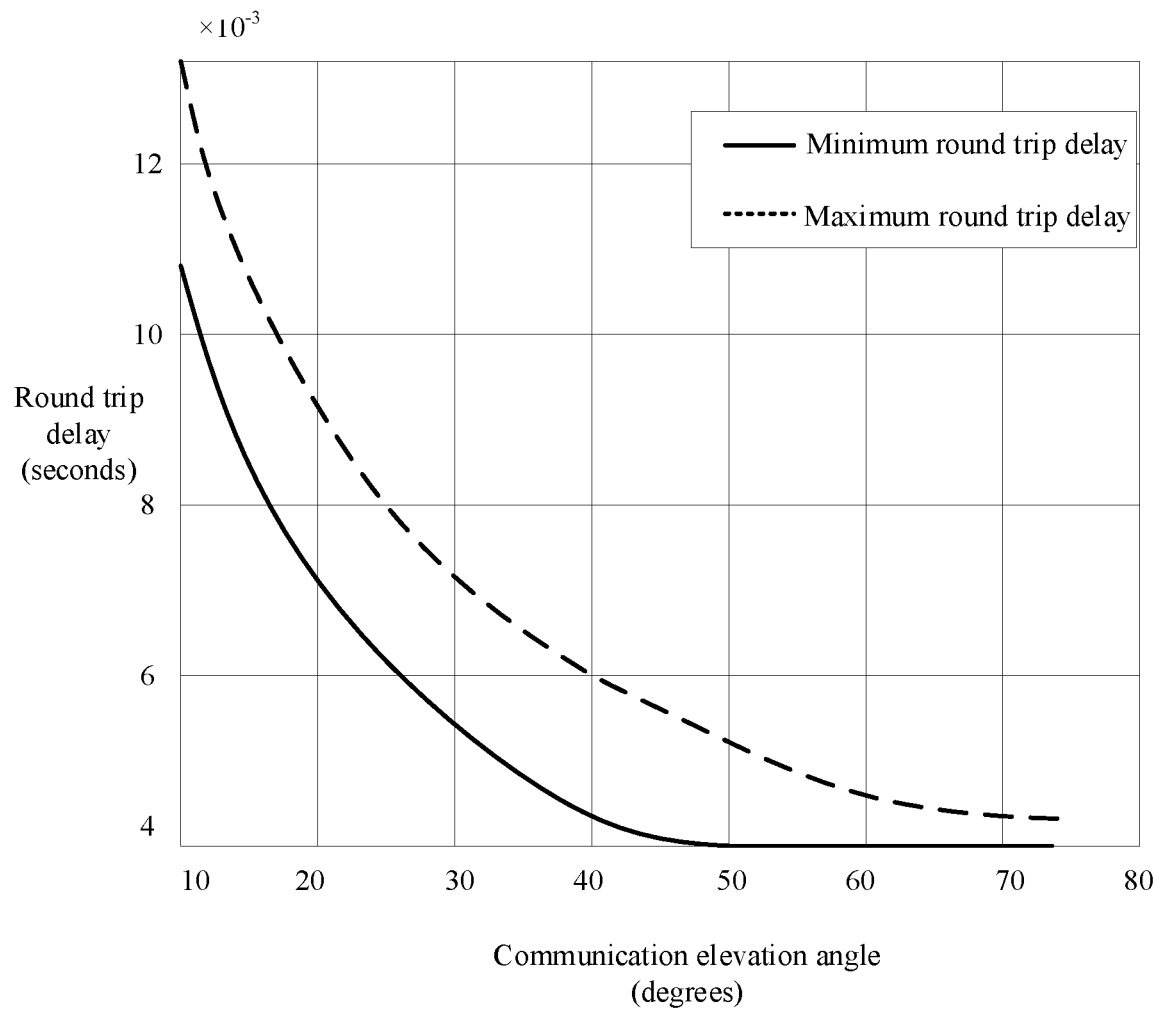
FIG. 1f is a schematic diagram of a correspondence between a communication elevation angle and a round trip delay according to an embodiment of this application.

For example, a diameter of a cell in the TN communication system is 350 km, and a maximum round trip delay corresponding to a terminal device in the cell may be 1.17 ms. The network device in FIG. 1b is used as an example. When a satellite orbit altitude in the NTN is 600 km and a beam diameter is 350 km, as shown in FIG. 1f, when a communication elevation angle of a terminal device in a beam/cell corresponding to the network device is 10 degrees, a round trip delay corresponding to the terminal device is the maximum. In this case, the maximum round trip delay may reach approximately 13 ms. The communication elevation angle of the terminal device may be an included angle between a straight line formed by the terminal device and the network device and a straight line formed by the terminal device and a center of the beam/cell.

Figure 1G:
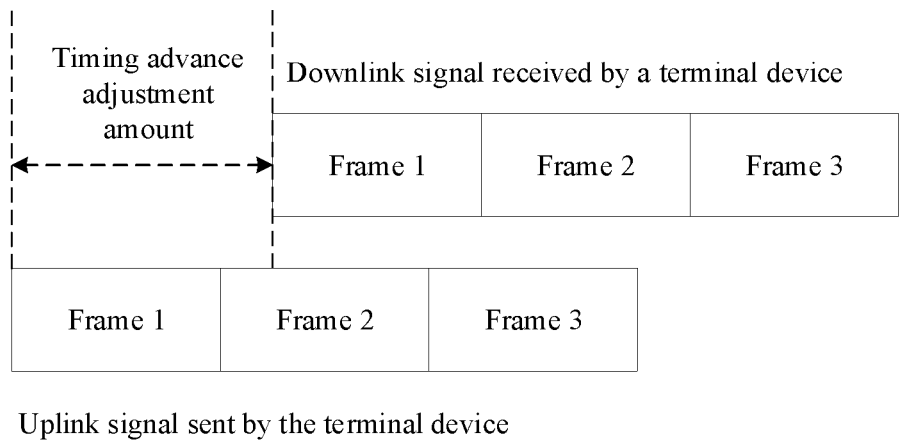
FIG. 1g is a schematic diagram of a correspondence between a signal and a slot according to an embodiment of this application.

Because a round trip delay corresponding to the terminal device in the NTN is large, to avoid interference between different terminal devices in a cell, the terminal device may determine a timing advance (timing advance, TA) adjustment amount based on the round trip delay corresponding to the terminal device. As shown in FIG. 1g, the terminal device may send an uplink signal in advance based on the timing advance adjustment amount, so that a time at which the uplink signal sent by the terminal device arrives at the network device is basically consistent with a timing of a downlink signal, thereby avoiding interference between different terminal devices in the cell. The timing advance adjustment amount of the terminal device is less than or equal to the round trip delay corresponding to the terminal device.

Specifically, after receiving the downlink signal sent by the network device, the terminal device may perform timing advance adjustment based on the preset delay and the timing advance adjustment amount, so that the time at which the uplink signal sent by the terminal device arrives at the network device is basically consistent with the timing of the downlink signal.

However, because the round trip delay corresponding to the terminal device is large, the timing advance adjustment amount determined by the network device for the terminal device based on the round trip delay corresponding to the terminal device is also large. When the timing advance adjustment amount of the terminal device is greater than the preset delay, the terminal device cannot send an uplink signal to the network device based on the timing advance adjustment amount.

Figure 1H:
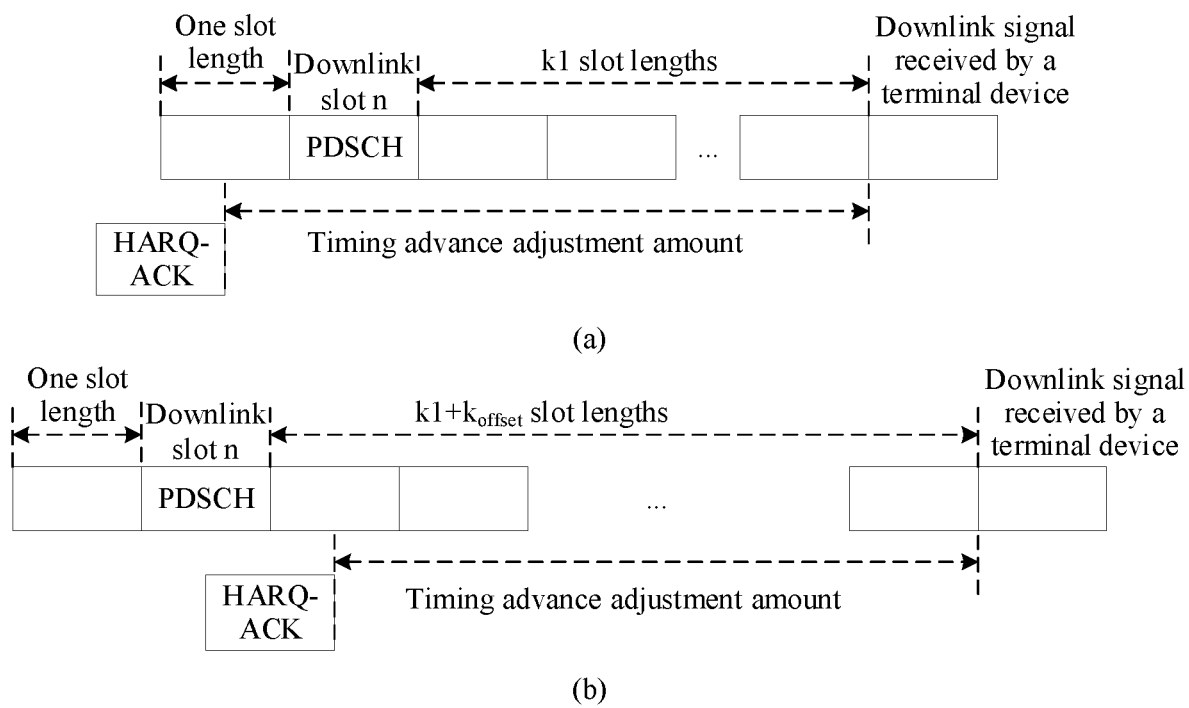
FIG. 1h is a schematic diagram of a correspondence between a signal and a slot according to an embodiment of this application.

For example, the foregoing example 1 is used as an example. As shown in (a) in FIG. 1h, assuming that the terminal device receives PDSCH data in a downlink slot n, the terminal device may feed back a HARQ-ACK to the network device in a slot n+k1 of a PUCCH. That is, a maximum value of timing advance adjustment that can be performed by the terminal device is k1 slot lengths. Because a maximum value of k1 is 15, assuming that a subcarrier spacing (subcarrier spacing, SCS) is 30 kHz and one slot length is 0.5 ms, the maximum value of timing advance adjustment that can be performed by the terminal device is 7.5 ms. It can be learned from FIG. 1f that a round trip delay corresponding to a terminal device in a beam or a cell in the NTN is far greater than 7.5 ms. Therefore, the k1 slot lengths cannot provide a sufficient time length for the terminal device to perform timing advance adjustment. That is, when the timing advance adjustment amount of the terminal device is greater than the preset delay, the terminal device cannot send an uplink signal to the network device based on the timing advance adjustment amount.

To avoid that the terminal device cannot send an uplink signal based on the timing advance adjustment amount because the timing advance adjustment amount of the terminal device is greater than the preset delay, a timing offset parameter is introduced. The network device sends a value of the timing offset parameter to the terminal device, so that after receiving the downlink signal, the terminal device has plenty of time to perform timing advance adjustment based on the preset delay and the value of the timing offset parameter. The value of the timing offset parameter is greater than or equal to the timing advance adjustment amount.

For example, the foregoing example 1 is used as an example. As shown in (b) in FIG. 1h, the network device may determine a value $k_{offset}$ of the timing offset parameter based on a timing advance adjustment amount reported by the terminal device, and send the value to the terminal device. Assuming that the terminal device receives PDSCH data in a downlink slot n, the terminal device may perform timing advance adjustment based on a slot $n+k1+k_{offset}$ of a PUCCH and the timing advance adjustment amount, to feed back a HARQ-ACK to the network device, so as to ensure that the terminal device can have plenty of time to perform timing advance adjustment.

Figure 1I:
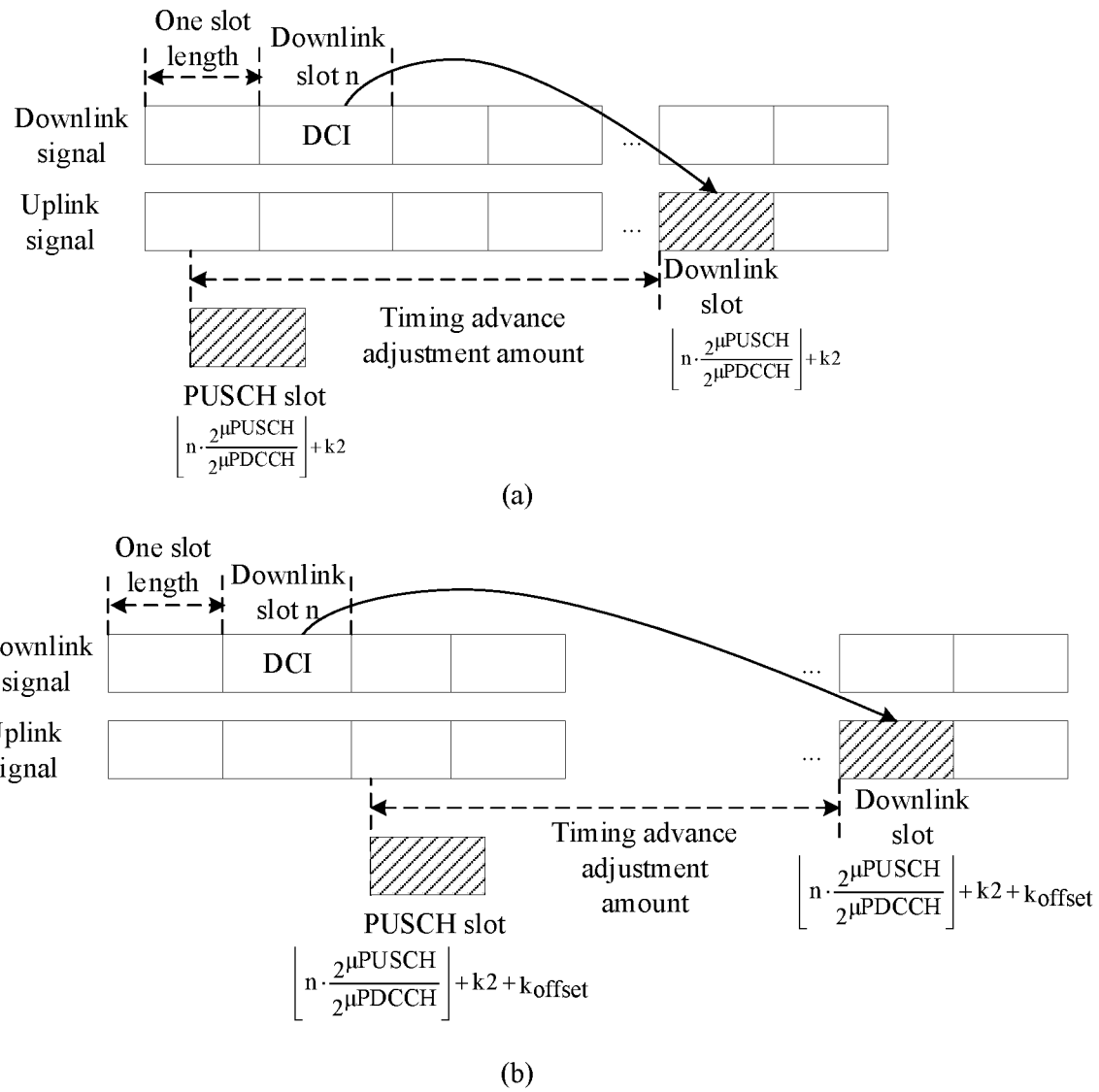
FIG. 1i is a schematic diagram of a correspondence between a signal and a slot according to an embodiment of this application.

For another example, the foregoing example 2 is used as an example. As shown in (a) in FIG. 1i, assuming that the terminal device receives, in a downlink slot n, uplink grant/scheduling information sent by the network device by using DCI, the terminal device may perform timing advance adjustment based on a preset delay k2 and a timing advance adjustment amount sent by the network device, and feed back PUSCH data to the network device.

However, when the timing advance adjustment amount of the terminal device is greater than the preset delay, the terminal device cannot feed back PUSCH data to the network device based on the timing advance adjustment amount. In this case, as shown in (b) in FIG. 1i, the network device may determine, based on a round trip delay corresponding to the terminal device, a value $k_{offset}$ of the timing offset parameter corresponding to the terminal device, and send the value to the terminal device. Assuming that the terminal device receives, in a downlink slot n, uplink grant/scheduling information sent by the network device by using DCI, the terminal device may perform timing advance adjustment based on a slot $$\left\lfloor n \cdot \frac{2^{\mu PUSCH}}{2^{\mu PDCCH}} \right\rfloor + k2 + k_{offset}$$

of a PUCCH and a timing advance adjustment amount, to feed back PUSCH data to the network device, so as to ensure that the terminal device can have plenty of time to perform timing advance adjustment.

Because the network device in the NTN is mobile, as the network device continuously moves, the distance between the network device and the terminal device continuously changes, and the round trip delay of the terminal device also continuously changes correspondingly. The network device may adjust the timing advance adjustment amount of the terminal device based on the round trip delay of the terminal device. In addition, the network device may also update the value of the timing offset parameter based on the round trip delay of the terminal device, to prevent an excessively large value of the timing offset parameter from causing a large scheduling delay corresponding to the terminal device and causing degradation of transmission efficiency.

For example, in an LEO-1200 gaze-mode scenario (that is, when a minimum communication elevation angle of the terminal device is 10 degrees), it is assumed that a subcarrier spacing is 30 kHz and a slot length is 0.5 ms. As the network device moves, a communication elevation angle between the terminal device and the network device changes (this may also be described as that a distance between the terminal device and the network device changes). A service link between the terminal device and the network device is used as an example. A change range of the round trip delay corresponding to the terminal device may be 8 ms to 20.872 ms. A change range of the value of the timing offset parameter configured by the network device for the terminal device is, for example, 16 to 42. To ensure smooth communication between the terminal device and the network device, the value of the timing offset parameter corresponding to the terminal device may be set to a maximum value 42. Even if the distance between the terminal device and the network device changes, a communication connection between the terminal device and the network device is not affected. However, if the value of the timing offset parameter remains large, a scheduling delay corresponding to the terminal device in the communication system is always large, degrading transmission efficiency.

Therefore, the network device may determine a new value of the timing offset parameter for the terminal device based on a timing advance adjustment amount used by the terminal device, that is, update the value of the timing offset parameter corresponding to the terminal device, and send an updated value of the timing offset parameter to the terminal device, thereby preventing an excessively large scheduling delay corresponding to the terminal device in the communication system from affecting transmission efficiency.

Figure 1J:
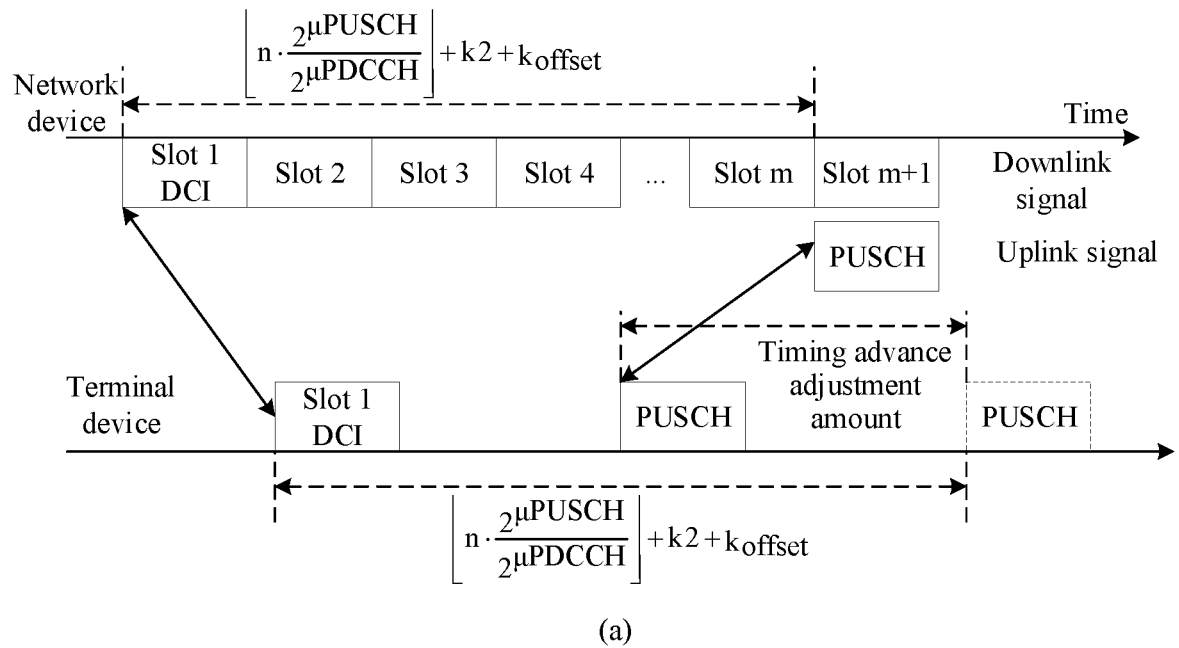
FIG. 1j is a schematic diagram of a correspondence between a signal and a slot according to an embodiment of this application.
Figure 1J:
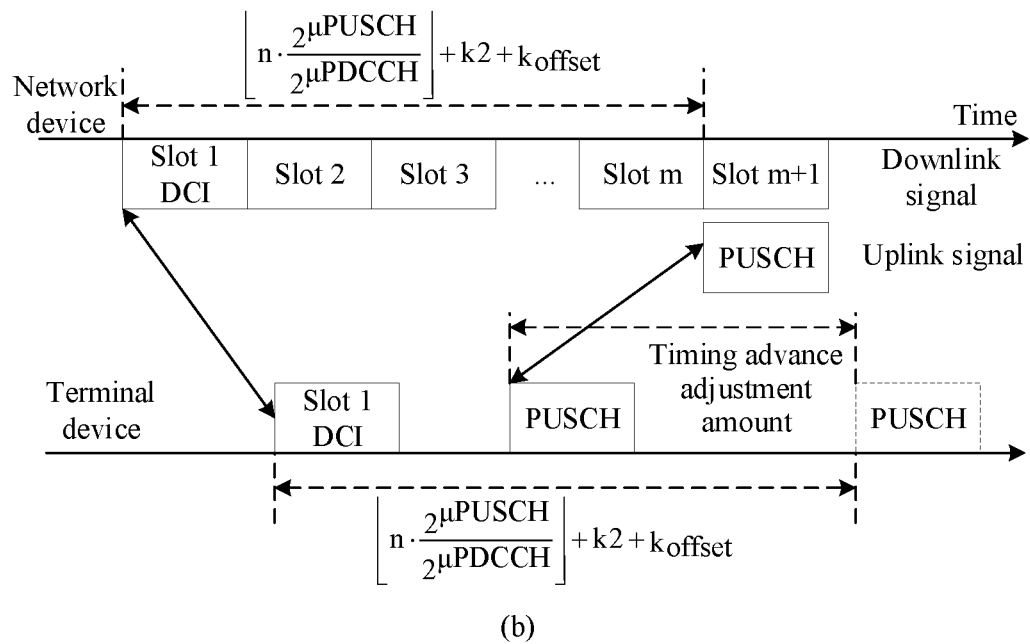

For example, as shown in (a) in FIG. 1j, when a time length indicated by the value of the timing offset parameter configured by the network device for the terminal device is far greater than a time length indicated by the timing advance adjustment amount, a large scheduling delay occurs when the network device sends a downlink signal to the terminal device to schedule the terminal device to send, to the network device, an uplink signal corresponding to the downlink signal. As shown in (b) in FIG. 1j, when the network device decreases the value of the timing offset parameter corresponding to the terminal device, for example, adjusts the time length indicated by the value of the timing offset parameter to be close to the time length indicated by the timing advance adjustment amount, a scheduling delay can be reduced, and transmission efficiency can be improved.

However, because a value range of the timing advance adjustment amount is large and occupies a large quantity of bits, when the network device updates the value of the timing offset parameter of the terminal device based on the timing advance adjustment amount reported by the terminal device, the terminal device continuously reports the timing advance adjustment amount to the network device, causing high signaling overheads.

To resolve this problem, an embodiment of this application provides a timing offset parameter update method. A terminal device obtains a timing advance adjustment variation corresponding to the terminal device, where the timing advance adjustment variation is a difference between a timing advance adjustment amount currently used by the terminal device and a timing advance adjustment amount used at a previous moment. The terminal device determines whether an absolute value of the timing advance adjustment variation is greater than or equal to a first threshold. If the absolute value is greater than or equal to the first threshold, the terminal device sends, to a network device, first indication information used to indicate an update regularity of a timing offset parameter. Compared with a case in which the terminal device continuously reports the timing advance adjustment amount to the network device so that the network device updates the value of the timing offset parameter, in this embodiment of this application, the terminal device reports the first indication information to the network device to indicate the network device to update the value of the timing offset parameter. This can reduce signaling overheads of the terminal device when the network device is indicated to update the value of the timing offset parameter.

Figure 2:
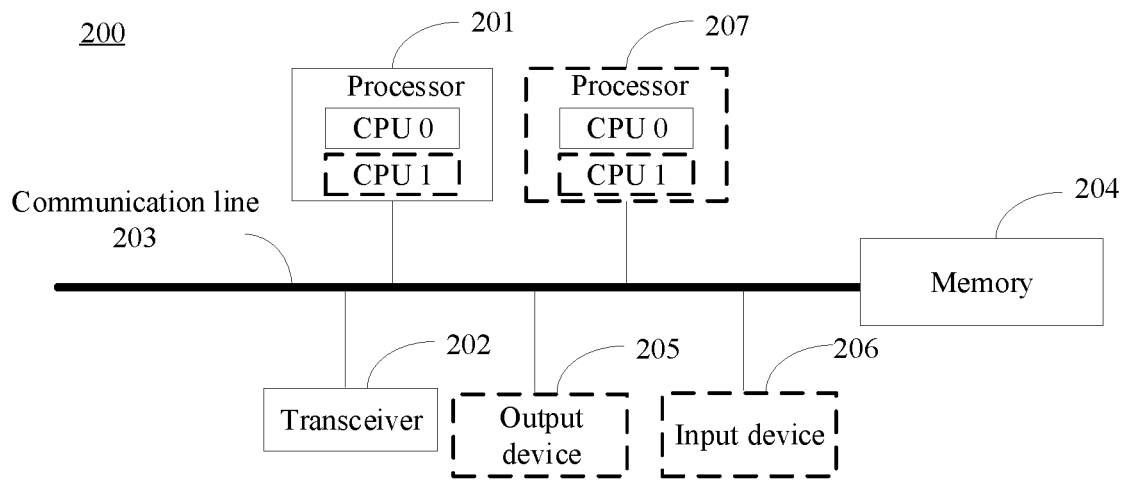
FIG. 2 is a diagram of a composition structure of a communication apparatus according to an embodiment of this application.

During specific implementation, as shown in FIG. 1a, for example, each terminal device and each network device may use a composition structure shown in FIG. 2, or include components shown in FIG. 2. FIG. 2 is a schematic diagram of composition of a communication apparatus 200 according to an embodiment of this application. The communication apparatus 200 may be a terminal device, a chip in a terminal device, or a system-on-a-chip; or may be a network device, a chip in a network device, or a system-on-a-chip. As shown in FIG. 2, the communication apparatus 200 includes a processor 201, a transceiver 202, and a communication line 203.

Further, the communication apparatus 200 may further include a memory 204. The processor 201, the memory 204, and the transceiver 202 may be connected through the communication line 203.

The processor 201 is a central processing unit (central processing unit, CPU), a general-purpose processor, a network processor (network processor, NP), a digital signal processor (digital signal processing, DSP), a microprocessor, a microcontroller, a programmable logic device (programmable logic device, PLD), or any combination thereof. Alternatively, the processor 201 may be another apparatus with a processing function, for example, a circuit, a device, or a software module. This is not limited.

The transceiver 202 is configured to communicate with another device or another communication network. The another communication network may be Ethernet, a radio access network (radio access network, RAN), a wireless local area network (wireless local area networks, WLAN), or the like. The transceiver 202 may be a module, a circuit, a transceiver, or any apparatus that can implement communication.

The communication line 203 is configured to transmit information between the components included in the communication apparatus 200.

The memory 204 is configured to store instructions. The instructions may be a computer program.

The memory 204 may be a read-only memory (read-only memory, ROM) or another type of static storage device that can store static information and/or instructions, may be a random access memory (random access memory, RAM) or another type of dynamic storage device that can store information and/or instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or the like. This is not limited.

It should be noted that the memory 204 may be independent of the processor 201, or may be integrated with the processor 201. The memory 204 may be configured to store instructions, program code, some data, or the like. The memory 204 may be located inside the communication apparatus 200, or may be located outside the communication apparatus 200. This is not limited. The processor 201 is configured to execute the instructions stored in the memory 204, to implement a timing offset parameter update method provided in the following embodiments of this application.

In an example, the processor 201 may include one or more CPUs, for example, a CPU 0 and a CPU 1 in FIG. 2.

In an optional implementation, the communication apparatus 200 includes a plurality of processors. For example, in addition to the processor 201 in FIG. 2, the communication apparatus 200 may further include a processor 207.

In an optional implementation, the communication apparatus 200 further includes an output device 205 and an input device 206. For example, the input device 206 is a device such as a keyboard, a mouse, a microphone, or a joystick, and the output device 205 is a device such as a display or a speaker (speaker).

It should be noted that the communication apparatus 200 may be a desktop computer, a portable computer, a network server, a mobile phone, a tablet computer, a wireless terminal, an embedded device, a chip system, or a device with a structure similar to that in FIG. 2. In addition, the composition structure shown in FIG. 2 does not constitute a limitation on the communication apparatus. In addition to the components shown in FIG. 2, the communication apparatus may include more or fewer components than those shown in the figure, or some components may be combined, or there may be a different component layout.

In this embodiment of this application, the chip system may include a chip, or may include a chip and another discrete device.

In addition, for actions, terms, and the like in embodiments of this application, reference may be made to each other. This is not limited. In embodiments of this application, names of messages exchanged between devices, names of parameters in the messages, and the like are merely examples. Other names may alternatively be used during specific implementation. This is not limited.

With reference to the communication system shown in FIG. 1a, the following describes a timing offset parameter update method provided in embodiments of this application. A terminal device may be any terminal device in the communication system, and a network device may be any network device that communicates with the terminal device in the communication system. Both the terminal device and the network device in the following embodiments may have the components shown in FIG. 2.

Figure 3A:
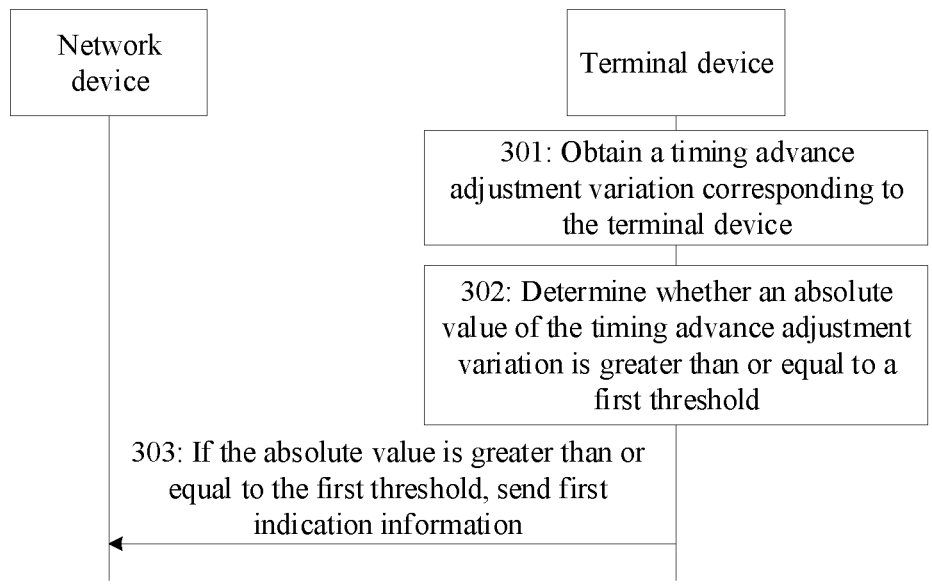
FIG. 3a is a flowchart of a timing offset parameter update method according to an embodiment of this application.

FIG. 3a is a flowchart of a timing offset parameter update method according to an embodiment of this application. As shown in FIG. 3a, the method may include the following steps.

Step 301: A terminal device obtains a timing advance adjustment variation corresponding to the terminal device.

The timing advance adjustment variation is a difference between a timing advance adjustment amount currently used by the terminal device and a timing advance adjustment amount used at a previous moment.

Specifically, the terminal device may determine, based on location information of the terminal device and location information of a network device, a round trip delay corresponding to the terminal device; and determine, based on the round trip delay, the timing advance adjustment amount corresponding to the terminal device.

For example, the terminal device may determine the location information of the terminal device based on a positioning unit of the terminal device. The positioning unit may be a positioning unit capable of positioning the terminal device, for example, a global positioning system (global positioning system, GPS) unit or a BeiDou navigation satellite system (beidou navigation satellite system, BDS) unit. This is not limited.

For example, the terminal device may receive the location information of the network device that is sent by the network device.

Specifically, when the network device includes a flight platform and an access network device, the location information of the network device may include location information of the flight platform and location information of the access network device. When the access network device is disposed on the flight platform, the location information of the network device includes the location information of the flight platform.

The location information of the flight platform may be ephemeris information. The ephemeris information may be a precise location or trajectory table used to indicate that operation of a space flight vehicle (for example, the flight platform) changes with time, and is used to describe a location and a speed of the space flight vehicle. The terminal device may determine parameters such as a time, the location, and the speed of the space flight vehicle based on the ephemeris information and by using a mathematical relationship between six orbit parameters of Kepler's laws.

It should be noted that, for specific descriptions of determining, by the terminal device, location information of the space flight vehicle based on the ephemeris information, reference may be made to the conventional technology. Details are not described.

Optionally, after receiving the location information sent by the network device, the terminal device determines, based on the location information sent by the network device, location information of the terminal device that corresponds to a same moment as the location information of the network device.

For example, the terminal device may determine a distance between the terminal device and the network device based on the location information of the terminal device and the location information of the network device, and determine, as the round trip delay corresponding to the terminal device, a quotient of twice the distance between the terminal device and the network device and a signal transmission speed.

For example, the terminal device may determine the round trip delay corresponding to the terminal device as the timing advance adjustment amount corresponding to the terminal device.

Specifically, the terminal device may obtain, in the foregoing manner, the timing advance adjustment amount currently used by the terminal device and the timing advance adjustment amount used by the terminal device at the previous moment, and determine the timing advance adjustment variation corresponding to the terminal device.

Step 302: The terminal device determines whether an absolute value of the timing advance adjustment variation is greater than or equal to a first threshold.

Specifically, the first threshold may be pre-specified in a communication protocol, or the first threshold is preconfigured by the network device for the terminal device. This is not limited.

For example, the first threshold may be used to indicate an update granularity of a timing offset parameter. When the absolute value of the timing advance adjustment variation is greater than the first threshold, it indicates that the update granularity of the timing offset parameter is met, and the terminal device may send first indication information to the network device, to indicate the network device to update, based on the first indication information, a value of the timing offset parameter corresponding to the terminal device.

Step 303: If the absolute value is greater than or equal to the first threshold, the terminal device sends the first indication information to the network device.

The first indication information may be used to indicate an update regularity of the timing offset parameter, and the update regularity is increasing the value of the timing offset parameter or decreasing the value of the timing offset parameter.

For example, the update regularity may include the update granularity of the timing offset parameter and an update direction of the timing offset parameter, so that after receiving the first indication information, the network device updates the value of the timing offset parameter according to the update regularity indicated in the first indication information.

For example, the update granularity is one granularity, and the update direction is increasing. In this case, the update regularity may be increasing the value of the timing offset parameter by one granularity. Alternatively, for example, the update granularity is one granularity, and the update direction is decreasing. In this case, the update regularity may be decreasing the value of the timing offset parameter by one granularity.

In a possible design, the terminal device sends the first indication information to the network device through a PUCCH.

For example, the terminal device may indicate the first indication information by using a cyclic shift in at least one symbol of the PUCCH.

Specifically, when the PUCCH uses a format format 0 and the format 0 includes a symbol 0 and a symbol 1, the terminal device may use a cyclic shift corresponding to one of the symbols to indicate a feedback status of a scheduling request (scheduling request, SR) and/or a HARQ-ACK, and use a cyclic shift corresponding to the other symbol to indicate the first indication information.

For example, the terminal device uses a cyclic shift corresponding to the symbol 0 to indicate the feedback status of the SR and/or the HARQ-ACK, and uses a cyclic shift corresponding to the symbol 1 to indicate the first indication information.

When the symbol 0 includes one bit, the terminal device may indicate the feedback status of the HARQ-ACK by using a cyclic shift based on a correspondence shown in the following Table 1. When a value of the HARQ-ACK is 0, it indicates a NACK. When a value of the HARQ-ACK is 1, it indicates an ACK. The terminal device may indicate a NACK to the network device by using a cyclic shift 0, and indicate an ACK to the network device by using a cyclic shift 6.

TABLE 1

| One-bit HARQ-ACK | | |
|---|---|---|
| HARQ-ACK | 0 | 1 |
| Cyclic shift | 0 | 6 |

When the symbol 0 includes one bit, the terminal device may alternatively indicate the feedback status of the SR and the HARQ-ACK based on a cyclic shift and a correspondence shown in the following Table 2. When a value of the HARQ-ACK is 0, it indicates a NACK. When a value of the HARQ-ACK is 1, it indicates an ACK. The terminal device may indicate a NACK and an SR to the network device by using a cyclic shift 3, and indicate an ACK and an SR to the network device by using a cyclic shift 9.

TABLE 2

| SR and one-bit HARQ-ACK | | |
|---|---|---|
| HARQ-ACK | 0 | 1 |
| Cyclic shift | 3 | 9 |

When the symbol 0 includes two bits, the terminal device may alternatively indicate feedback statuses of two HARQ-ACKs based on a cyclic shift and a correspondence shown in the following Table 3. When a value of the HARQ-ACK is 0, it indicates a NACK. When a value of the HARQ-ACK is 1, it indicates an ACK. The terminal device may indicate a NACK and a NACK to the network device by using a cyclic shift 0, indicate a NACK and an ACK to the network device by using a cyclic shift 3, indicate an ACK and an ACK to the network device by using a cyclic shift 6, and indicate an ACK and a NACK to the network device by using a cyclic shift 9.

TABLE 3

Two-bit HARQ-ACK

| HARQ-ACK | {0, 0} | {0, 1} | {1, 1} | {1, 0} |
|---|---|---|---|---|
| Cyclic shift | 0 | 3 | 6 | 9 |

When the symbol 0 includes two bits, the terminal device may alternatively indicate feedback statuses of two HARQ-ACKs and an SR based on a cyclic shift and a correspondence shown in the following Table 4. When a value of the HARQ-ACK is 0, it indicates a NACK. When a value of the HARQ-ACK is 1, it indicates an ACK. The terminal device may indicate a NACK, a NACK, and an SR to the network device by using a cyclic shift 1, indicate a NACK, an ACK, and an SR to the network device by using a cyclic shift 4, indicate an ACK, an ACK, and an SR to the network device by using a cyclic shift 7, and indicate an ACK, a NACK, and an SR to the network device by using a cyclic shift 11.

TABLE 4

Two-bit HARQ-ACK and SR

| HARQ-ACK | {0, 0} | {0, 1} | {1, 1} | {1, 0} |
|---|---|---|---|---|
| Cyclic shift | 1 | 4 | 7 | 11 |

When the symbol 1 includes one bit, the terminal device may indicate the first indication information by using a cyclic shift based on a correspondence shown in the following Table 5. It is assumed that, when a value of the first indication information is 0, it indicates that the value of the timing offset parameter is to be decreased by one granularity; and when a value of the first indication information is 1, it indicates that the value of the timing offset parameter is to be increased by one granularity. In this case, the terminal device may indicate, by using a cyclic shift 3, the network device to decrease the value of the timing offset parameter by one granularity; and indicate, by using a cyclic shift 9, the network device to increase the value of the timing offset parameter by one granularity.

TABLE 5

One-bit first indication information

| First indication information | 0 | 1 |
|---|---|---|
| Cyclic shift | 3 | 9 |

When the symbol 1 includes two bits, the terminal device may indicate the HARQ-ACK and the first indication information by using a cyclic shift based on a correspondence shown in the following Table 6. When a value of the HARQ-ACK is 0, it indicates a NACK. When a value of the HARQ-ACK is 1, it indicates an ACK. It is assumed that, when a value of the first indication information is 0, it indicates that the value of the timing offset parameter is to be decreased by one granularity; and when a value of the first indication information is 1, it indicates that the value of the timing offset parameter is to be increased by one granularity. In this case, the terminal device may indicate, by using a cyclic shift 1, a NACK to the network device and indicate the network device to decrease the value of the timing offset parameter by one granularity; indicate, by using a cyclic shift 4, a NACK to the network device and indicate the network device to increase the value of the timing offset parameter by one granularity; indicate, by using a cyclic shift 7, an ACK to the network device and indicate the network device to increase the value of the timing offset parameter by one granularity; and indicate, by using a cyclic shift 11, an ACK to the network device and indicate the network device to decrease the value of the timing offset parameter by one granularity.

TABLE 6

One-bit HARQ-ACK and one-bit first indication information

| HARQ-ACK and first indication information | {0, 0} | {0, 1} | {1, 1} | {1, 0} |
|---|---|---|---|---|
| Cyclic shift | 1 | 4 | 7 | 11 |

When the symbol 1 includes three bits, the terminal device may indicate two HARQ-ACKs and the first indication information by using a cyclic shift based on a correspondence shown in the following Table 7. When a value of the HARQ-ACK is 0, it indicates a NACK. When a value of the HARQ-ACK is 1, it indicates an ACK. It is assumed that, when a value of the first indication information is 0, it indicates that the value of the timing offset parameter is to be decreased by one granularity; and when a value of the first indication information is 1, it indicates that the value of the timing offset parameter is to be increased by one granularity. In this case, the terminal device may indicate, by using a cyclic shift 1, a NACK and a NACK to the network device and indicate the network device to decrease the value of the timing offset parameter by one granularity; indicate, by using a cyclic shift 4, a NACK and an ACK to the network device and indicate the network device to decrease the value of the timing offset parameter by one granularity; indicate, by using a cyclic shift 7, an ACK and an ACK to the network device and indicate the network device to decrease the value of the timing offset parameter by one granularity; indicate, by using a cyclic shift 11, an ACK and a NACK to the network device and indicate the network device to decrease the value of the timing offset parameter by one granularity; indicate, by using a cyclic shift 2, a NACK and a NACK to the network device and indicate the network device to increase the value of the timing offset parameter by one granularity; indicate, by using a cyclic shift 5, a NACK and an ACK to the network device and indicate the network device to increase the value of the timing offset parameter by one granularity; indicate, by using a cyclic shift 8, an ACK and an ACK to the network device and indicate the network device to increase the value of the timing offset parameter by one granularity; and indicate, by using a cyclic shift 10, an ACK and a NACK to the network device and indicate the network device to increase the value of the timing offset parameter by one granularity.

TABLE 7

Two-bit HARQ-ACK and one-bit first indication information

| | HARQ-ACK and first indication information | | | | | | | |
|---|---|---|---|---|---|---|---|---|
| | {0, 0, 0} | {0, 1, 0} | {1, 1, 0} | {1, 0, 0} | {0, 0, 1} | {0, 1, 1} | {1, 1, 1} | {1, 0, 1} |
| Cyclic shift | 1 | 4 | 7 | 11 | 2 | 5 | 8 | 10 |

When the symbol 1 includes one bit, the terminal device may indicate the first indication information by using a cyclic shift based on a correspondence shown in the following Table 8. It is assumed that, when a value of the first indication information is 0, it indicates that the value of the timing offset parameter is to be decreased by one granularity; and when a value of the first indication information is 1, it indicates that the value of the timing offset parameter is to be increased by one granularity. In this case, the terminal device may indicate, by using a cyclic shift 0, the network device to decrease the value of the timing offset parameter by one granularity; and indicate, by using a cyclic shift 6, the network device to increase the value of the timing offset parameter by one granularity.

TABLE 8

One-bit first indication information

| First indication information | 0 | 1 |
|---|---|---|
| Cyclic shift | 0 | 6 |

When the symbol 1 includes one bit, the terminal device may indicate the SR and the first indication information by using a cyclic shift based on a correspondence shown in the following Table 9. It is assumed that, when a value of the first indication information is 0, it indicates that the value of the timing offset parameter is to be decreased by one granularity; and when a value of the first indication information is 1, it indicates that the value of the timing offset parameter is to be increased by one granularity. In this case, the terminal device may indicate, by using a cyclic shift 3, the SR to the network device and indicate the network device to decrease the value of the timing offset parameter by one granularity; and indicate, by using a cyclic shift 9, the SR to the network device and indicate the network device to increase the value of the timing offset parameter by one granularity.

TABLE 9

SR and one-bit first indication information

| First indication information | 0 | 1 |
|---|---|---|
| Cyclic shift | 3 | 9 |

Specifically, when the PUCCH uses a format format 1, the terminal device may use some cyclic shifts to indicate the first indication information. The format 1 may include 12 cyclic shifts.

For example, the terminal device may establish a correspondence between cyclic shifts 0 to 5 and first indication information used to indicate the network device to decrease the value of the timing offset parameter by one granularity, and establish a correspondence between cyclic shifts 6 to 11 and first indication information used to indicate the network device to increase the value of the timing offset parameter by one granularity.

Specifically, when the PUCCH uses a format format 2, a format 3, or a format 4, the terminal device may add, to encoded information, a bit corresponding to the first indication information.

For example, the terminal device may directly add at least one bit to the format 2, the format 3, or the format 4 to indicate the first indication information.

For example, one bit is added to indicate the first indication information. The terminal device may indicate, by setting the added bit to 0, the network device to decrease the value of the timing offset parameter by one granularity; or indicate, by setting the added bit to 1, the network device to increase the value of the timing offset parameter by one granularity.

The terminal device may add, to a PUCCH through encoding and concatenation, the at least one bit added to indicate the first indication information.

For example, an encoded bit stream of uplink control information (uplink control information, UCI) is a0, a1, . . . , an. If only the first indication information exists, a quantity of encoded bits corresponding to the first indication information may be a0. If a plurality of types of UCI information exist, for example, a HARQ-ACK, an SR, the value of the timing offset parameter, and CSI exist, encoding and concatenation may be performed according to an order of the UCI information, and a quantity of encoded bits corresponding to the first indication information may be an, where n=a quantity of bits of the HARQ-ACK+a quantity of bits of the SR+a quantity of bits of the value of the timing offset parameter+a quantity of bits of the CSI.

In another possible design, the terminal device sends the first indication information to the network device through a PUSCH.

Specifically, the terminal device may add, to encoded information of the PUSCH, a bit corresponding to the first indication information. For example, at least one bit is added to the PUSCH to indicate the first indication information.

For example, the terminal device may add, to the PUSCH through independent encoding, the at least one bit added to indicate the first indication information.

For example, the terminal device may encode the first indication information by using the following formula:

$$Q'_{K_{offset}} = \min\left\{\left\lceil\frac{(O_{K_{offset}} + L_{K_{offset}}) \cdot \beta_{offset}^{K_{offset}} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\left\lceil\alpha \cdot \sum_{l=l_0}^{N_{symb,all}^{PUSCH}-1} M_{sc}^{UCI}(l)\right\rceil\right\},$$

where $O_{K_{offset}}$ is a quantity of bits of the timing offset parameter, $L_{K_{offset}}$ is a quantity of bits of a CRC, $\beta_{offset}^{K_{offset}}$ is a code rate compensation factor for the timing offset parameter, $M_{sc}^{UCI}(l)$ is a quantity of subcarriers that are in a symbol l and that can be used to carry UCI, $$\sum_{r=0}^{C_{UL-SCH}-1} K_r$$

indicates a quanuty of REs that are in the PUSCH and that can be used to carry UCI, and $$\sum_{l=l_0}^{N_{symb,all}^{PUSCH}-1} M_{sc}^{UCI}(l)$$

in the denominator indicates a size of a payload (payload) of uplink data.

In another possible design, the terminal device includes the first indication information in MAC CE signaling, and sends the MAC CE signaling to the network device.

Specifically, the terminal device may select at least one bit in a reserved field of the MAC CE signaling to indicate the first indication information. The MAC CE signaling includes 64 bits, and the 33rd bit to the 51st bit are the reserved (reserved) field.

For example, the terminal device selects the 33rd bit of the MAC CE signaling to indicate the first indication information. The terminal device may set the 33rd bit to 0 to indicate the network device to decrease the value of the timing offset parameter by one update granularity when updating the value of the timing offset parameter, or may set the 33rd bit to 1 to indicate the network device to increase the value of the timing offset parameter by one update granularity when updating the value of the timing offset parameter.

According to the method shown in FIG. 3a, compared with a case in which the terminal device continuously reports the timing advance adjustment amount to the network device so that the network device updates the value of the timing offset parameter, in this embodiment of this application, the terminal device reports the first indication information to the network device to indicate the network device to update the value of the timing offset parameter. This can reduce signaling overheads of the terminal device when the network device is indicated to update the value of the timing offset parameter.

Figure 3B:
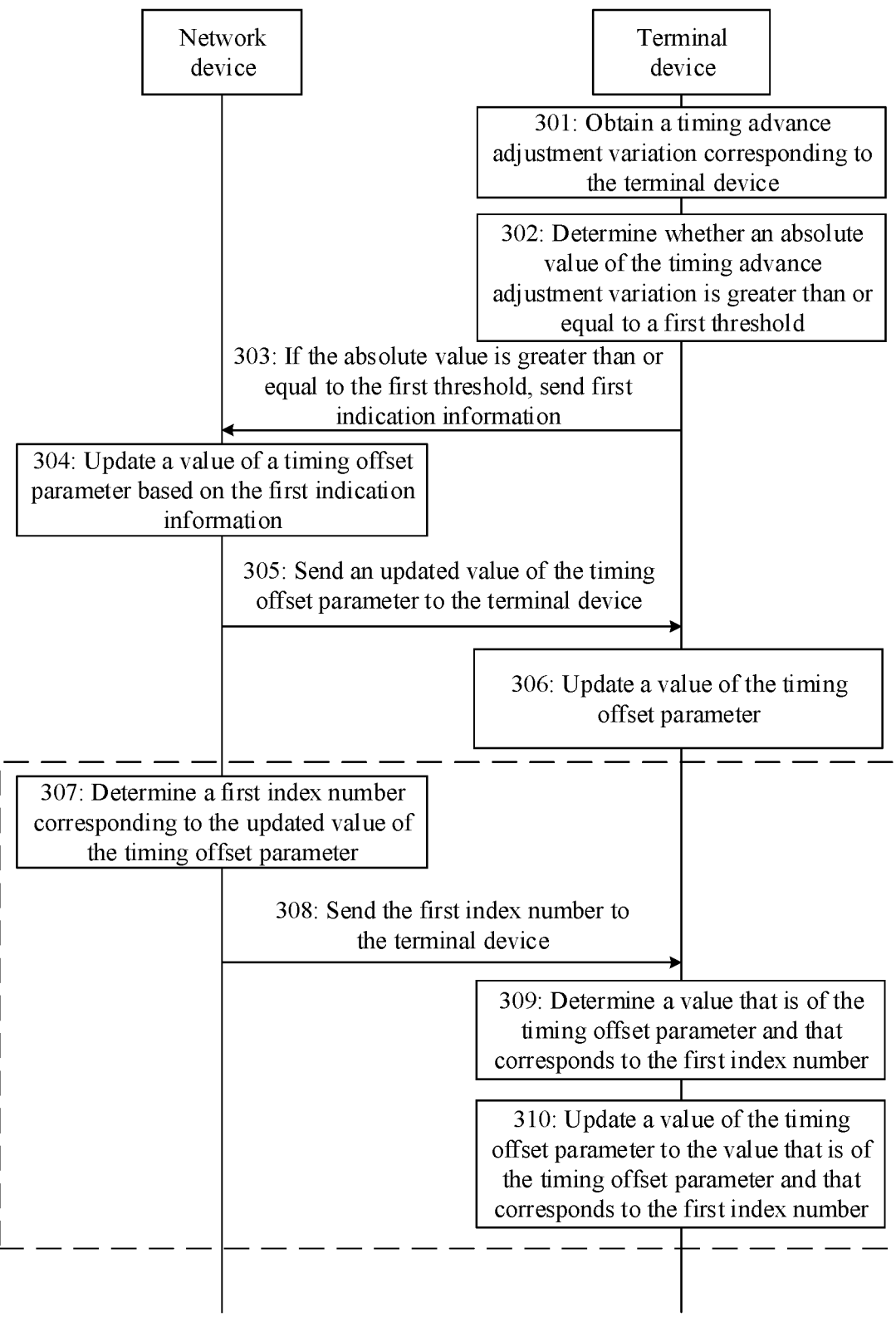
FIG. 3b is a flowchart of a timing offset parameter update method according to an embodiment of this application.

Further, as shown in FIG. 3b, after receiving the first indication information, the network device may further send an updated value of the timing offset parameter to the terminal device according to the following step 304 and step 305; or send a first index number corresponding to an updated value of the timing offset parameter to the terminal device according to the following step 304, step 307, and step 308, so that the terminal device updates the value of the timing offset parameter based on the received updated value of the timing offset parameter or the received first index number.

Step 304: The network device updates the value of the timing offset parameter based on the first indication information.

Specifically, the network device may update, based on the update granularity and the update direction that are included in the update regularity in the first indication information, the value of the timing offset parameter corresponding to the terminal device.

Step 305: The network device sends the updated value of the timing offset parameter to the terminal device.

Optionally, the network device determines whether the absolute value of the timing offset variation corresponding to the terminal device is greater than or equal to a second threshold, and if the absolute value is greater than or equal to the second threshold, the network device sends the updated value of the timing offset parameter to the terminal device.

The timing offset variation is a difference between a value that is of the timing offset parameter and that is currently used by the terminal device and the updated value of the timing offset parameter.

Specifically, when the timing offset variation corresponding to the terminal device is greater than or equal to the second threshold, the network device may send the updated value of the timing offset parameter to the terminal device. This prevents the network device from frequently sending an updated value of the timing offset parameter to the terminal device, thereby reducing signaling overheads of the network device.

It should be noted that the second threshold may be pre-specified in a communication protocol, or may be pre-determined by the network device. This is not limited.

Step 306: The terminal device updates the value of the timing offset parameter.

Specifically, the terminal device may update the currently used value of the timing offset parameter to the value of the timing offset parameter that is sent by the network device.

Step 307: The network device determines, from a correspondence between an index number and a value of the timing offset parameter based on the updated value of the timing offset parameter, the first index number corresponding to the updated value of the timing offset parameter.

Specifically, the network device may determine, based on an area in which the terminal device is located, a maximum value and a minimum value of the timing offset parameter that correspond to the area. The area may be a coverage area of a beam, a cell, or a satellite.

Figure 3C:
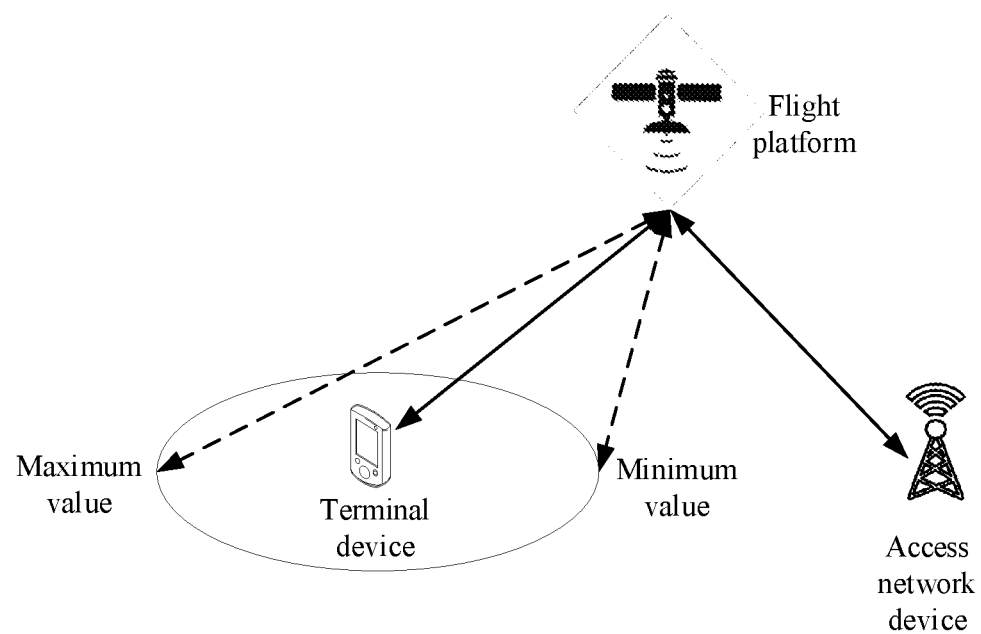
FIG. 3c is a schematic diagram of a communication architecture of a communication system according to an embodiment of this application.

For example, as shown in FIG. 3c, the network device may determine, based on a point closest to the network device in the area, the minimum value that is of the timing offset parameter and that corresponds to the current area; and determine, based on a point farthest from the network device in the area, the maximum value that is of the timing offset parameter and that corresponds to the current area. A value that is of the timing offset parameter and that corresponds to the area is quantized based on the maximum value, the minimum value, and a preset granularity; and a corresponding index number is determined for the value of the timing offset parameter based on a quantization result.

For example, the maximum value that is of the timing offset parameter and that is determined by the network device is 15 slot lengths, and the minimum value is 10 slot lengths. Assuming that the network device quantizes the value of the timing offset parameter by using 1 as a granularity, the correspondence between a value of the timing offset parameter and an index number may be shown in the following Table 10.

TABLE 10

| Index number | Value (slot length) of the timing offset parameter |
|---|---|
| 0 | 10 |
| 1 | 11 |
| 2 | 12 |
| 3 | 13 |
| 4 | 14 |
| 5 | 15 |

Optionally, the network device stores the correspondence between an index number and a value of the timing offset parameter.

Optionally, the network device broadcasts the correspondence between an index number and a value of the timing offset parameter in a cell or a beam by using SIB signaling.

Optionally, the network device sends the correspondence between an index number and a value of the timing offset parameter to the terminal device by using DCI, RRC, or MAC CE signaling.

It should be noted that the terminal device and the network device may store the correspondence between an index number and a value of the timing offset parameter in the table form shown in Table 10, or may store the correspondence between an index number and a value of the timing offset parameter in an array form, or may store the correspondence between an index number and a value of the timing offset parameter in another form. This is not limited.

For example, the correspondence shown in Table 10 is used as an example. Assuming that the terminal device and the network device store the correspondence between an index number and a value of the timing offset parameter in an array form, the terminal device and the network device may store the correspondence between an index number and a value of the timing offset parameter as (0, 10), (1, 11), (2, 12), (3, 13), (4, 14), and (5, 15).

Step 308: The network device sends the first index number to the terminal device.

Step 309: The terminal device determines, from the correspondence between an index number and a value of the timing offset parameter based on the first index number, a value that is of the timing offset parameter and that corresponds to the first index number.

Step 310: The terminal device updates the value of the timing offset parameter to the value that is of the timing offset parameter and that corresponds to the first index number.

Specifically, when indicating the updated value of the timing offset parameter to the terminal device, the network device sends the first index number to the terminal device, so that a range of the timing offset parameter is narrowed through quantization, and signaling overheads of the network device are reduced.

Figure 4:
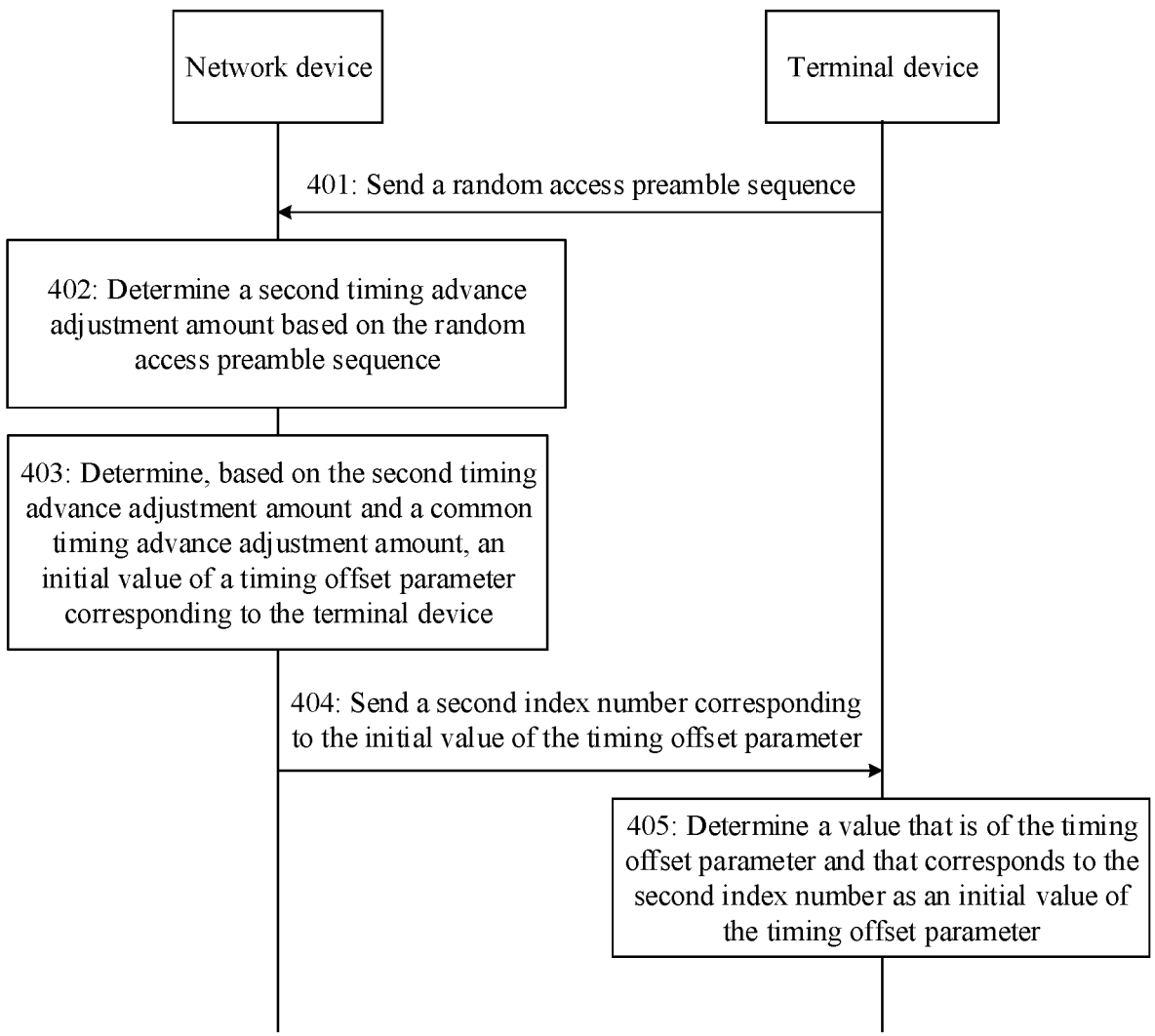
FIG. 4 is a flowchart of a timing offset parameter update method according to an embodiment of this application.

Based on FIG. 3a, the terminal device and the network device may update the value of the timing offset parameter by using the method shown in FIG. 3a. Refer to FIG. 4 to FIG. 6. The terminal device and the network device may further determine an initial value of the timing offset parameter in a random access process by using any one of the following methods shown in FIG. 4 to FIG. 6.

When the terminal device does not perform self-compensation on a timing point in the random access process, the terminal device and the network device may determine the initial value of the timing offset parameter by using a method shown in FIG. 4.

FIG. 4 is a flowchart of a timing offset parameter update method according to an embodiment of this application. As shown in FIG. 4, the method may include the following steps.

Step 401: A terminal device sends a random access preamble sequence to a network device.

Specifically, the terminal device may send the random access preamble sequence to the network device in a random access process.

The random access preamble sequence may be a ZC sequence.

Step 402: The network device determines a second timing advance adjustment amount based on the random access preamble sequence.

Specifically, the network device may perform matching between the random access preamble sequence and a pre-stored ZC sequence; calculate, by using a sliding window algorithm, a delay between a ZC sequence corresponding to the random access preamble sequence and a ZC sequence that is prestored on the network device and that has a highest correlation with the ZC sequence corresponding to the random access preamble sequence; and determine the delay as the second timing advance adjustment amount.

Step 403: The network device determines, based on the second timing advance adjustment amount and a common timing advance adjustment amount, an initial value of a timing offset parameter corresponding to the terminal device.

The common timing advance adjustment amount may be a timing advance adjustment amount corresponding to a reference point, and the reference point is any point in an area corresponding to the terminal device.

For example, the terminal device corresponds to a beam. The reference point may be any point in a terrestrial area covered by the beam, or may be any point in an air area covered by the beam, or may be a flight platform in the network device. This is not limited.

Specifically, when the reference point is any point in the terrestrial area covered by the beam, the reference point may be a point closest to the network device, a point farthest from the network device, or a center point of the terrestrial area covered by the beam. This is not limited.

Specifically, the network device may determine the common timing advance adjustment amount based on location information of the reference point and location information of the network device.

For example, the network device may determine a round trip delay corresponding to the reference point as the common timing advance adjustment amount.

Specifically, the network device may determine a sum of the second timing advance adjustment amount and the common timing advance adjustment amount as the initial value of the timing offset parameter.

Step 404: The network device sends, to the terminal device based on a correspondence between an index number and a value of the timing offset parameter, a second index number corresponding to the initial value of the timing offset parameter.

Specifically, the network device may determine the correspondence between an index number and a value of the timing offset parameter according to the method in step 306. Details are not described again.

Step 405: The terminal device determines, based on the correspondence between an index number and a value of the timing offset parameter, a value that is of the timing offset parameter and that corresponds to the second index number as an initial value of the timing offset parameter.

Figure 5A:
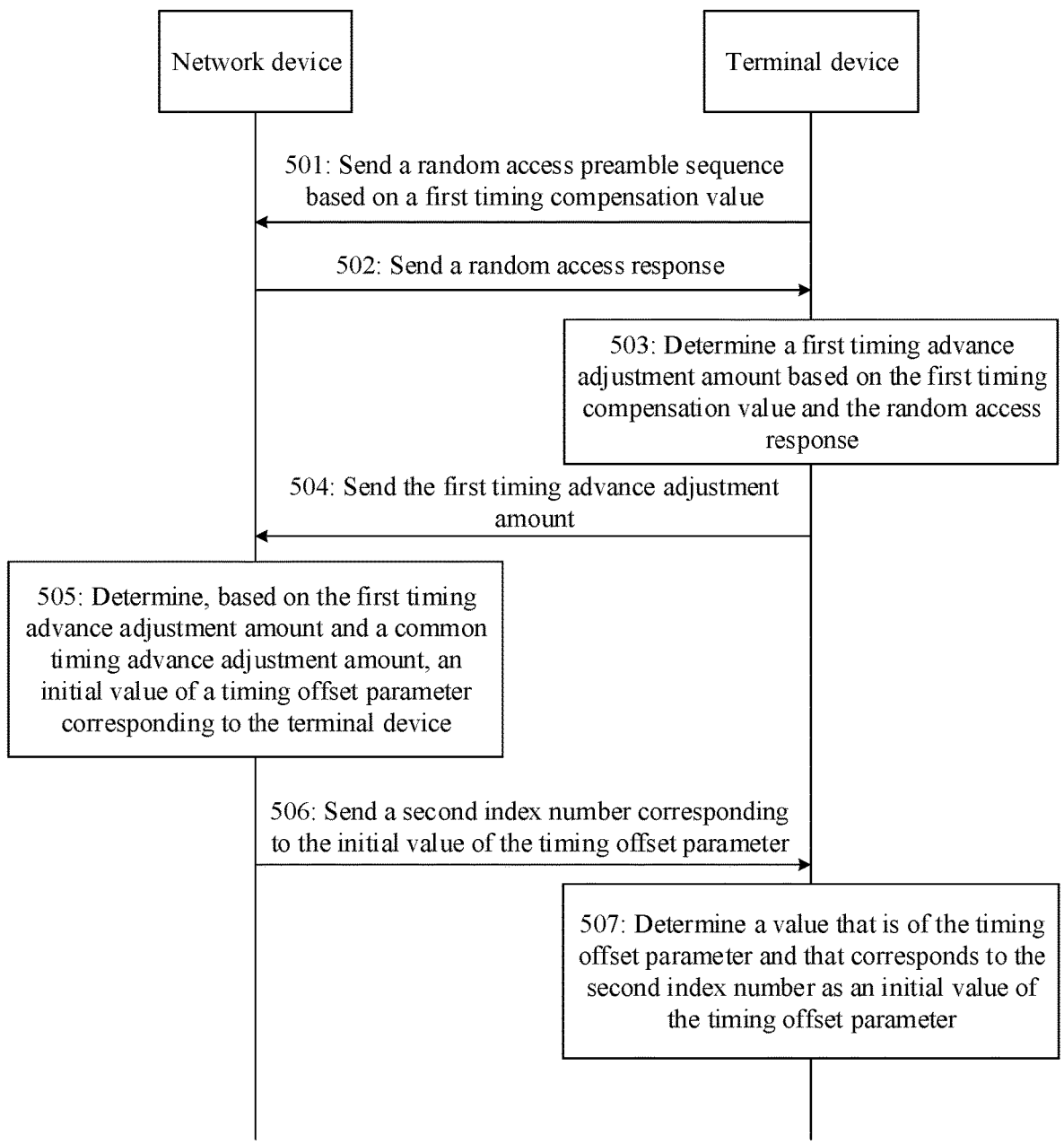
FIG. 5a is a flowchart of a timing offset parameter update method according to an embodiment of this application.
Figure 6:
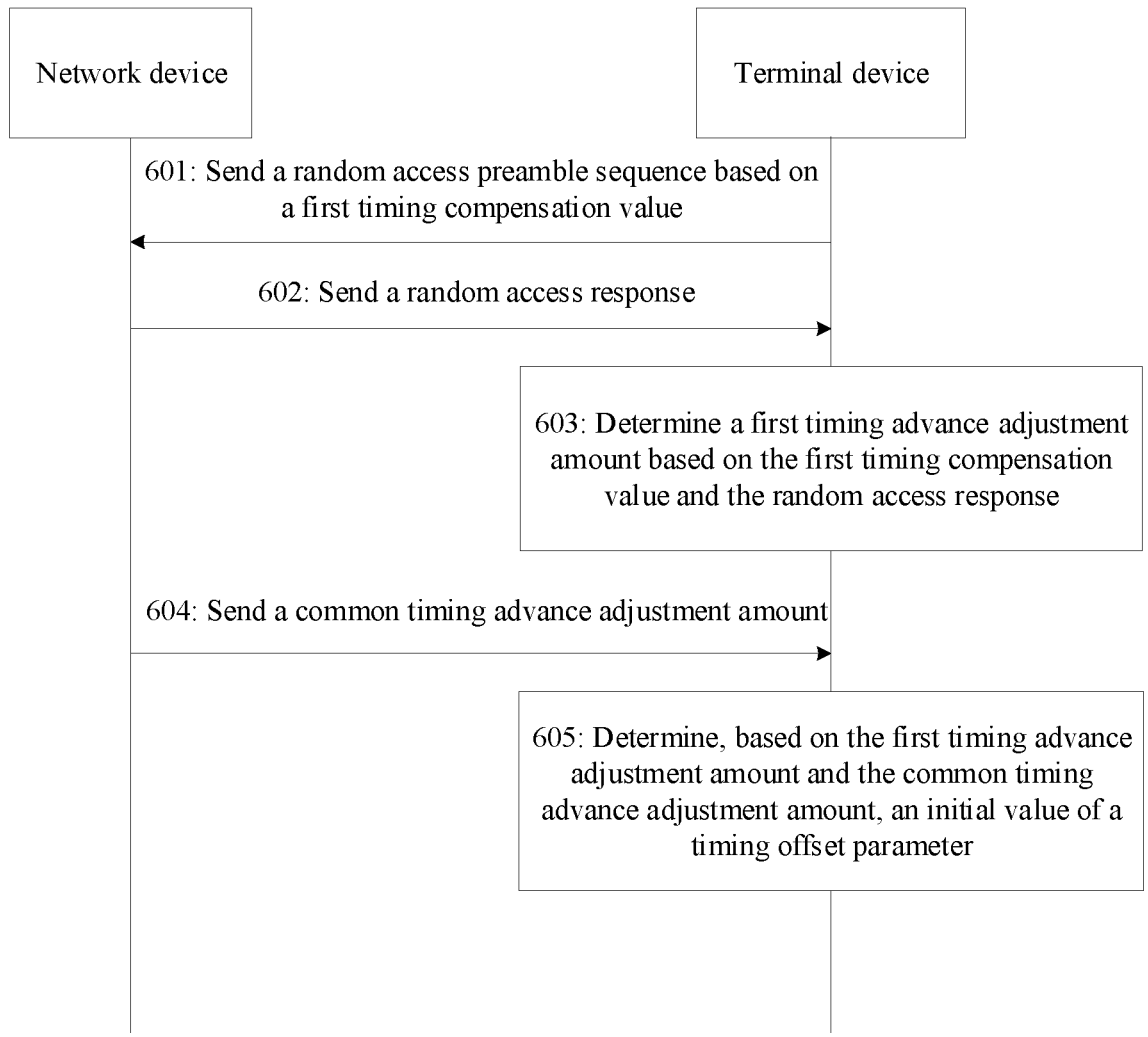
FIG. 6 is a flowchart of a timing offset parameter update method according to an embodiment of this application.

When the terminal device performs self-compensation on a timing point in the random access process, the terminal device and the network device may determine the initial value of the timing offset parameter by using a method shown in FIG. 5a.

FIG. 5a is a flowchart of a timing offset parameter update method according to an embodiment of this application. As shown in FIG. 5a, the method may include the following steps.

Step 501: A terminal device sends a random access preamble sequence to a network device based on a first timing compensation value.

Specifically, the terminal device may send the random access preamble sequence to the network device in advance based on the first timing compensation value in a random access process.

Figure 5B:
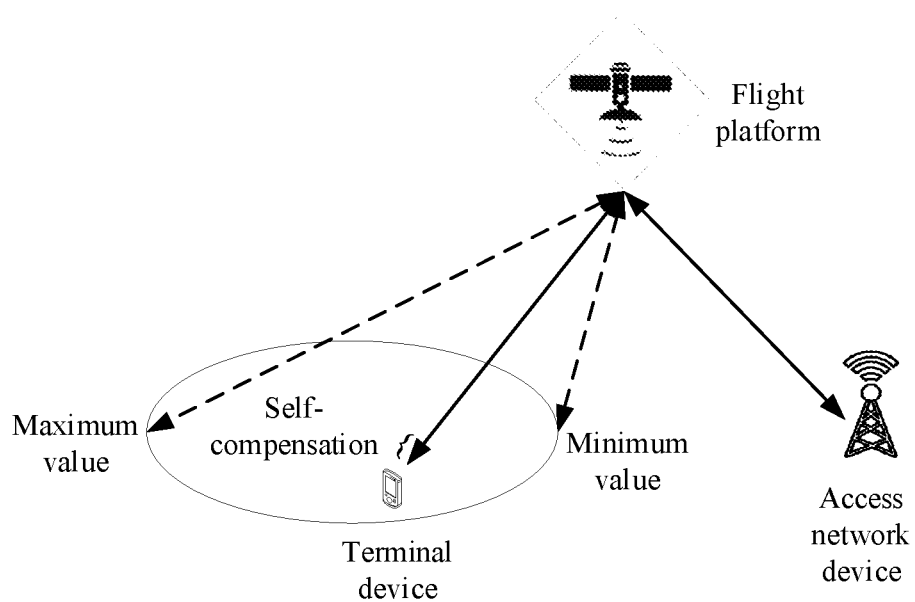
FIG. 5b is a schematic diagram of a communication architecture of a communication system according to an embodiment of this application.

For example, as shown in FIG. 5b, the terminal device may perform self-compensation on a timing point, that is, send the random access preamble sequence to the network device in advance based on the first timing compensation value.

The first timing compensation value may be pre-specified in a communication protocol, or may be determined by the terminal device. This is not limited.

Step 502: The network device sends a random access response to the terminal device.

Step 503: The terminal device determines a first timing advance adjustment amount based on the first timing compensation value and the random access response.

Specifically, the network device may perform matching between the random access response and a prestored ZC sequence; calculate, by using a sliding window algorithm, a delay between a ZC sequence corresponding to the random access response and a ZC sequence that is prestored on the network device and that has a highest correlation with the ZC sequence corresponding to the random access response; and determine the delay as a timing advance adjustment amount corresponding to the random access response.

Specifically, the terminal device may determine a sum of the first timing compensation value and the timing advance adjustment amount corresponding to the random access response as the first timing advance adjustment amount.

Step 504: The terminal device sends the first timing advance adjustment amount to the network device.

Step 505: The network device determines, based on the first timing advance adjustment amount and a common timing advance adjustment amount, an initial value of a timing offset parameter corresponding to the terminal device.

For descriptions of the common timing advance adjustment amount, refer to the descriptions of the common timing advance adjustment amount in FIG. 4. Details are not described again.

Specifically, the network device may determine a sum of the first timing advance adjustment amount and the common timing advance adjustment amount as the initial value of the timing offset parameter corresponding to the terminal device.

Step 506: The network device sends, to the terminal device based on a correspondence between an index number and a value of the timing offset parameter, a second index number corresponding to the initial value of the timing offset parameter.

Step 507: The terminal device determines, based on the correspondence between an index number and a value of the timing offset parameter, a value that is of the timing offset parameter and that corresponds to the second index number as an initial value of the timing offset parameter.

When the terminal device performs self-compensation on a timing point in the random access process, the terminal device and the network device may alternatively determine the initial value of the timing offset parameter by using a method shown in FIG. 6.

FIG. 6 is a flowchart of a timing offset parameter update method according to an embodiment of this application. As shown in FIG. 6, the method may include the following steps.

Step 601: A terminal device sends a random access preamble sequence to a network device based on a first timing compensation value.

Step 602: The network device sends a random access response to the terminal device.

Step 603: The terminal device determines a first timing advance adjustment amount based on the first timing compensation value and the random access response.

For specific descriptions of step 601 to step 603, refer to the specific descriptions of step 501 to step 503. Details are not described again.

Step 604: The network device sends a common timing advance adjustment amount to the terminal device.

Step 605: The terminal device determines an initial value of a timing offset parameter based on the first timing advance adjustment amount and the common timing advance adjustment amount.

Specifically, the terminal device may determine a sum of the first timing advance adjustment amount and the common timing advance adjustment amount as the initial value of the timing offset parameter.

Further, in the methods shown in FIG. 4 to FIG. 6, the network device may also perform timing compensation on an uplink signal sent by the terminal device, that is, the network device determines a second timing compensation value for the terminal device.

It should be noted that, when the network device determines the second timing compensation value for the terminal device, the network device may obtain a common timing advance adjustment amount by subtracting the second timing compensation value from a timing advance adjustment amount determined based on a reference point.

For example, the second timing compensation value determined by the network device for the terminal device is equal to the timing advance adjustment amount determined based on the reference point, that is, the common timing advance adjustment amount is 0. When the initial value of the timing offset parameter is determined by using the method shown in FIG. 4, the network device may determine the second timing advance adjustment amount as the initial value of the timing offset parameter. When the initial value of the timing offset parameter is determined by using the method shown in FIG. 5a or FIG. 6, the terminal device and the network device may determine the first timing advance adjustment amount as the initial value of the timing offset parameter.

The foregoing mainly describes solutions provided in embodiments of this application from a perspective of interaction between devices. It may be understood that, to implement the foregoing functions, each device includes corresponding hardware structures and/or software modules for performing the functions. A person skilled in the art should easily be aware that, in combination with algorithm steps of examples described in embodiments disclosed in this specification, this application can be implemented by hardware or a combination of hardware and computer software. Whether a function is performed by hardware or hardware driven by computer software depends on a particular application and a design constraint of technical solutions. A person skilled in the art may use different methods to implement the described functions for each particular application, but it should not be considered that the implementation goes beyond the scope of this application.

In embodiments of this application, functional modules of each device may be obtained through division according to the foregoing method examples. For example, the functional modules may be obtained through division corresponding to various functions, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

Figure 7:
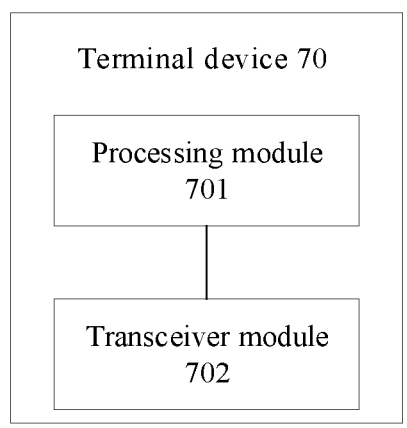
FIG. 7 is a schematic diagram of a structure of a terminal device according to an embodiment of this application.

When the functional modules are obtained through division corresponding to the functions, FIG. 7 shows a terminal device. The terminal device 70 may include a processing module 701 and a transceiver module 702. For example, the terminal device 70 may be a terminal device, or may be a chip used in a terminal device or another combined device or component that has a function of the foregoing terminal device. When the terminal device 70 is a terminal device, the transceiver module 702 may be a transceiver, where the transceiver may include an antenna, a radio frequency circuit, and the like; and the processing module 701 may be a processor (or a processing circuit), for example, a baseband processor, where the baseband processor may include one or more CPUs. When the terminal device 70 is a component that has a function of the foregoing terminal device, the transceiver module 702 may be a radio frequency unit, and the processing module 701 may be a processor (or a processing circuit), for example, a baseband processor. When the terminal device 70 is a chip system, the transceiver module 702 may be an input/output interface of a chip (for example, a baseband chip), and the processing module 701 may be a processor (or a processing circuit) of the chip system, and may include one or more central processing units. It should be understood that the transceiver module 702 in this embodiment of this application may be implemented by using a transceiver or a transceiver-related circuit component, and the processing module 701 may be implemented by using a processor or a processor-related circuit component (or referred to as a processing circuit).

For example, the processing module 701 may be configured to perform all operations, other than sending and receiving operations, that are performed by the terminal device in the embodiments shown in FIG. 3a to FIG. 6, and/or configured to support another process of the technology described in this specification; and the transceiver module 702 may be configured to perform all sending and receiving operations performed by the terminal device in the embodiments shown in FIG. 3a to FIG. 6, and/or configured to support another process of the technology described in this specification.

Specifically, the processing module 701 is configured to obtain a timing advance adjustment variation corresponding to the terminal device, where the timing advance adjustment variation is a difference between a timing advance adjustment amount currently used by the terminal device and a timing advance adjustment amount used at a previous moment; the processing module 701 is further configured to determine whether an absolute value of the timing advance adjustment variation is greater than or equal to a first threshold; and the transceiver module 702 is configured to: if the absolute value is greater than or equal to the first threshold, send, to a network device, first indication information used to indicate an update regularity of a timing offset parameter.

In a possible design, the transceiver module 702 is further configured to send the first indication information to the network device through a physical uplink control channel PUCCH; or send the first indication information to the network device through a physical uplink shared channel PUSCH; or include the first indication information in MAC CE signaling, and send the MAC CE signaling to the network device.

In a possible design, the update regularity is increasing a value of the timing offset parameter or decreasing a value of the timing offset parameter.

In a possible design, the transceiver module 702 is further configured to receive a first index number from the network device; the processing module 701 is further configured to determine, from a correspondence between an index number and a value of the timing offset parameter based on the first index number, a value that is of the timing offset parameter and that corresponds to the first index number; and the processing module 701 is further configured to update the value of the timing offset parameter to the value that is of the timing offset parameter and that corresponds to the first index number.

In a possible design, the transceiver module 702 is further configured to send a random access preamble sequence to the network device, and receive, from the network device, a second index number determined based on the random access preamble sequence; and the processing module 701 is further configured to determine, based on the correspondence between an index number and a value of the timing offset parameter, a value that is of the timing offset parameter and that corresponds to the second index number as an initial value of the timing offset parameter.

In a possible design, the transceiver module 702 is further configured to send a random access preamble sequence to the network device based on a first timing compensation value, and receive a random access response from the network device; and the processing module 701 is further configured to determine a first timing advance adjustment amount based on the first timing compensation value and the random access response.

In a possible design, the transceiver module 702 is further configured to send the first timing advance adjustment amount to the network device, and receive, from the network device, a second index number determined based on the first timing advance adjustment amount; and the processing module 701 is further configured to determine, based on the correspondence between an index number and a value of the timing offset parameter, a value that is of the timing offset parameter and that corresponds to the second index number as an initial value of the timing offset parameter.

In a possible design, the transceiver module 702 is further configured to receive a common timing advance adjustment amount from the network device, where the common timing advance adjustment amount is a timing advance adjustment amount corresponding to a reference point; and the terminal device determines an initial value of the timing offset parameter based on the first timing advance adjustment amount and the common timing advance adjustment amount.

In another possible implementation, the processing module 701 in FIG. 7 may be replaced with a processor, where the processor may be integrated with a function of the processing module 701; and the transceiver module 702 may be replaced with a transceiver, where the transceiver is integrated with a function of the transceiver module 702. Further, the terminal device 70 shown in FIG. 7 may further include a memory. When the processing module 701 is replaced with the processor and the transceiver module 702 is replaced with the transceiver, the terminal device 70 included in this embodiment of this application may be the communication apparatus shown in FIG. 2.

Figure 8:
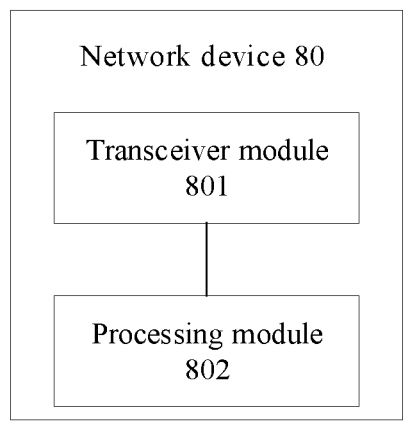
FIG. 8 is a schematic diagram of a structure of a network device according to an embodiment of this application.

When the functional modules are obtained through division corresponding to the functions, FIG. 8 shows a network device. The network device 80 may include a transceiver module 801 and a processing module 802. For example, the network device 80 may be a network device, or may be a chip used in a network device or another combined device or component that has a function of the foregoing network device. When the network device 80 is a network device, the transceiver module 801 may be a transceiver, where the transceiver may include an antenna, a radio frequency circuit, and the like; and the processing module 802 may be a processor (or a processing circuit), for example, a baseband processor, where the baseband processor may include one or more CPUs. When the network device 80 is a component that has a function of the foregoing network device, the transceiver module 801 may be a radio frequency unit, and the processing module 802 may be a processor (or a processing circuit), for example, a baseband processor. When the network device 80 is a chip system, the transceiver module 801 may be an input/output interface of a chip (for example, a baseband chip), and the processing module 802 may be a processor (or a processing circuit) of the chip system, and may include one or more central processing units. It should be understood that the transceiver module 801 in this embodiment of this application may be implemented by using a transceiver or a transceiver-related circuit component, and the processing module 802 may be implemented by using a processor or a processor-related circuit component (or referred to as a processing circuit).

For example, the transceiver module 801 may be configured to perform all sending and receiving operations performed by the network device in the embodiments shown in FIG. 3a to FIG. 6, and/or configured to support another process of the technology described in this specification; and the processing module 802 may be configured to perform all operations, other than the sending and receiving operations, that are performed by the network device in the embodiments shown in FIG. 3a to FIG. 6, and/or configured to support another process of the technology described in this specification.

The transceiver module 801 is configured to obtain first indication information used to indicate an update regularity of a timing offset parameter corresponding to a terminal device. The processing module 802 is configured to update a value of the timing offset parameter based on the first indication information. The transceiver module 801 is configured to send an updated value of the timing offset parameter to the terminal device.

In a possible design, the transceiver module 801 is configured to receive the first indication information from the terminal device through a physical uplink control channel PUCCH; or receive the first indication information from the terminal device through a physical uplink shared channel PUSCH; or receive, from the terminal device, MAC CE signaling that carries the first indication information.

In a possible design, the processing module 802 is configured to determine whether an absolute value of a timing offset variation corresponding to the terminal device is greater than or equal to a second threshold, where the timing offset variation is a difference between a value that is of the timing offset parameter and that is currently used by the terminal device and the updated value of the timing offset parameter; and the transceiver module 801 is configured to: if the absolute value is greater than or equal to the second threshold, send the updated value of the timing offset parameter to the terminal device.

In a possible design, the processing module 802 is configured to determine, from a correspondence between an index number and a value of the timing offset parameter based on the updated value of the timing offset parameter, a first index number corresponding to the updated value of the timing offset parameter; and the transceiver module 801 is configured to send the first index number to the terminal device.

In a possible design, the processing module 802 is configured to determine a maximum value and a minimum value of the timing offset parameter that correspond to an area in which the terminal device is located, where the area is a coverage area of a beam, a cell, or a satellite; the processing module 802 is configured to quantize, based on a preset granularity, a value that is of the timing offset parameter and that corresponds to the area; and the processing module 802 is configured to determine, based on a quantized value of the timing offset parameter, an index number corresponding to the value of the timing offset parameter, and stores a correspondence between the index number and the value of the timing offset parameter.

In a possible design, the transceiver module 801 is configured to receive a random access preamble sequence from the terminal device; the processing module 802 is configured to determine a second timing advance adjustment amount based on the random access preamble sequence; the processing module 802 is configured to determine, based on the second timing advance adjustment amount and a common timing advance adjustment amount, an initial value of the timing offset parameter corresponding to the terminal device, where the common timing advance adjustment amount is a timing advance adjustment amount corresponding to a reference point; and the transceiver module 801 is configured to send, to the terminal device based on the correspondence between an index number and a value of the timing offset parameter, a second index number corresponding to the initial value of the timing offset parameter.

In a possible design, the transceiver module 801 is configured to receive a random access preamble sequence from a terminal device, and send a random access response to the terminal device based on the random access preamble sequence.

In a possible design, the transceiver module 801 is configured to receive a first timing advance adjustment amount from the terminal device; the processing module 802 is configured to determine, based on the first timing advance adjustment amount and a common timing advance adjustment amount, an initial value of the timing offset parameter corresponding to the terminal device, where the common timing advance adjustment amount is a timing advance adjustment amount corresponding to a reference point; and the transceiver module 801 is configured to send, to the terminal device based on the correspondence between an index number and a value of the timing offset parameter, a second index number corresponding to the initial value of the timing offset parameter.

In a possible design, the transceiver module 801 is configured to send a common timing advance adjustment amount to the terminal device, where the common timing advance adjustment amount is a timing advance adjustment amount corresponding to a reference point.

In another possible implementation, the transceiver module 801 in FIG. 8 may be replaced with a transceiver, where the transceiver is integrated with a function of the transceiver module 801; and the processing module 802 may be replaced with a processor, where the processor is integrated with a function of the processing module 802. Further, the network device 80 shown in FIG. 8 may further include a memory. When the transceiver module 801 is replaced with the transceiver and the processing module 802 is replaced with the processor, the network device 80 included in this embodiment of this application may be the communication apparatus shown in FIG. 2.

An embodiment of this application further provides a computer-readable storage medium. All or some of the processes in the foregoing method embodiments may be implemented by a computer program instructing related hardware. The program may be stored in the computer-readable storage medium. When the program is executed, the processes of the foregoing method embodiments may be included. The computer-readable storage medium may be an internal storage unit of the terminal (including a data transmit end and/or a data receive end) in any one of the foregoing embodiments, for example, a hard disk drive or a memory of the terminal. Alternatively, the computer-readable storage medium may be an external storage device of the terminal, for example, a plug-in hard disk, a smart media card (smart media card, SMC), a secure digital (secure digital, SD) card, a flash card (flash card), or the like that is configured on the terminal. Further, the computer-readable storage medium may alternatively include both an internal storage unit of the terminal and an external storage device. The computer-readable storage medium is configured to store the computer program and other programs and data that are required by the terminal. The computer-readable storage medium may be further configured to temporarily store data that has been output or is to be output.

It should be noted that, in the specification, claims, and accompanying drawings of this application, the terms "first", "second", and the like are intended to distinguish between different objects but do not indicate a particular order. In addition, the terms "comprise", "include", and any variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, "at least one" means one or more, "a plurality of" means two or more, "at least two" means two, three, or more, and "and/or" is used to describe an association relationship between associated objects, and indicates that there may be three relationships. For example, "A and/or B" may indicate the following three cases: Only A exists, only B exists, and both A and B exist, where A and B may be singular or plural. The character "/" usually indicates an "or" relationship between associated objects. "At least one of the following" or a similar expression thereof indicates any combination of the items, including any combination of one or more of the items. For example, at least one of a, b, or c may indicate a, b, c, a and b, a and c, b and c, or a, b, and c, where a, b, and c may be singular or plural.

Based on the foregoing descriptions of the implementations, a person skilled in the art may clearly understand that, for the purpose of convenient and brief description, division into the foregoing functional modules is merely used as an example for description. During actual application, the foregoing functions may be allocated to different functional modules for implementation according to a requirement, that is, an inner structure of an apparatus is divided into different functional modules to implement all or some of the functions described above.

In several embodiments provided in this application, it should be understood that the disclosed apparatuses and methods may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts shown as units may be one or more physical units, that is, may be located in one place, or may be distributed in a plurality of different places. Some or all of the units may be selected according to an actual requirement to achieve objectives of solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of steps of methods in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A timing offset parameter update method, comprising:
obtaining, by a terminal device, a timing advance adjustment variation corresponding to the terminal device, wherein the timing advance adjustment variation is a difference between a timing advance adjustment amount currently used by the terminal device and a timing advance adjustment amount used at a previous moment;

determining, by the terminal device, whether an absolute value of the timing advance adjustment variation is greater than or equal to a first threshold; and if the absolute value is greater than or equal to the first threshold, sending, by the terminal device, first indication information to a network device, wherein the first indication information is used to indicate an update regularity of a timing offset parameter.

2. The method according to claim 1, wherein the sending, by the terminal device, first indication information to a network device comprises:

sending, by the terminal device, the first indication information to the network device through a physical uplink control channel PUCCH; or sending, by the terminal device, the first indication information to the network device through a physical uplink shared channel PUSCH; or sending, by the terminal device, MAC CE signaling to the network device, wherein the first indication information is carried in the MAC CE signaling.

3. The method according to claim 1, wherein
the update regularity is increasing a value of the timing offset parameter or decreasing a value of the timing offset parameter.

4. The method according to claim 1, wherein the method further comprises:

receiving, by the terminal device, a first index number from the network device;

determining, by the terminal device from a correspondence between an index number and a value of the timing offset parameter based on the first index number, a value that is of the timing offset parameter and that corresponds to the first index number; and updating, by the terminal device, the value of the timing offset parameter to the value that is of the timing offset parameter and that corresponds to the first index number.

5. The method according to claim 1, wherein the method further comprises:

sending, by the terminal device, a random access preamble sequence to the network device;

receiving, by the terminal device from the network device, a second index number determined based on the random access preamble sequence; and determining, by the terminal device based on the correspondence between an index number and a value of the timing offset parameter, a value that is of the timing offset parameter and that corresponds to the second index number as an initial value of the timing offset parameter.

6. The method according to claim 1, wherein the method further comprises:

sending, by the terminal device, a random access preamble sequence to the network device based on a first timing compensation value;

receiving, by the terminal device, a random access response from the network device; and determining, by the terminal device, a first timing advance adjustment amount based on the first timing compensation value and the random access response.

7. The method according to claim 6, wherein the method further comprises:

sending, by the terminal device, the first timing advance adjustment amount to the network device;

receiving, by the terminal device from the network device, a second index number determined based on the first timing advance adjustment amount; and determining, by the terminal device based on the correspondence between an index number and a value of the timing offset parameter, a value that is of the timing offset parameter and that corresponds to the second index number as an initial value of the timing offset parameter.

8. The method according to claim 6, wherein the method further comprises:

receiving, by the terminal device, a common timing advance adjustment amount from the network device, wherein the common timing advance adjustment amount is a timing advance adjustment amount corresponding to a reference point; and determining, by the terminal device, an initial value of the timing offset parameter based on the first timing advance adjustment amount and the common timing advance adjustment amount.

9. A timing offset parameter update method, comprising:

obtaining, by a network device, first indication information, wherein the first indication information is used to indicate an update regularity of a timing offset parameter corresponding to a terminal device;

updating, by the network device, a value of the timing offset parameter based on the first indication information; and sending, by the network device, an updated value of the timing offset parameter to the terminal device.

10. The method according to claim 9, wherein the obtaining, by a network device, first indication information comprises:

receiving, by the network device, the first indication information from the terminal device through a physical uplink control channel PUCCH; or receiving, by the network device, the first indication information from the terminal device through a physical uplink shared channel PUSCH; or receiving, by the network device from the terminal device, MAC CE signaling that carries the first indication information.

11. The method according to claim 9, wherein the sending, by the network device, an updated value of the timing offset parameter to the terminal device comprises:

determining, by the network device, whether an absolute value of a timing offset variation corresponding to the terminal device is greater than or equal to a second threshold, wherein the timing offset variation is a difference between a value that is of the timing offset parameter and that is currently used by the terminal device and the updated value of the timing offset parameter; and if the absolute value is greater than or equal to the second threshold, sending, by the network device, the updated value of the timing offset parameter to the terminal device.

12. The method according to claim 9, wherein the method further comprises:

determining, by the network device from a correspondence between an index number and a value of the timing offset parameter based on the updated value of the timing offset parameter, a first index number corresponding to the updated value of the timing offset parameter; and sending, by the network device, the first index number to the terminal device.

13. The method according to claim 12, wherein the method further comprises:

determining, by the network device, a maximum value and a minimum value of the timing offset parameter that correspond to an area in which the terminal device is located, wherein the area is a coverage area of a beam, a cell, or a satellite;

quantizing, by the network device based on a preset granularity, a value that is of the timing offset parameter and that corresponds to the area; and determining, by the network device based on a quantized value of the timing offset parameter, an index number corresponding to the value of the timing offset parameter, and storing a correspondence between the index number and the value of the timing offset parameter.

14. The method according to claim 9, wherein the method further comprises:

receiving, by the network device, a random access preamble sequence from the terminal device;

determining, by the network device, a second timing advance adjustment amount based on the random access preamble sequence;

determining, by the network device based on the second timing advance adjustment amount and a common timing advance adjustment amount, an initial value of the timing offset parameter corresponding to the terminal device, wherein the common timing advance adjustment amount is a timing advance adjustment amount corresponding to a reference point; and sending, by the network device to the terminal device based on the correspondence between an index number and a value of the timing offset parameter, a second index number corresponding to the initial value of the timing offset parameter.

15. The method according to claim 9, wherein the method further comprises:

receiving, by the network device, a random access preamble sequence from the terminal device; and sending, by the network device, a random access response to the terminal device based on the random access preamble sequence.

16. The method according to claim 15, wherein the method further comprises:

receiving, by the network device, a first timing advance adjustment amount from the terminal device;

determining, by the network device based on the first timing advance adjustment amount and a common timing advance adjustment amount, an initial value of the timing offset parameter corresponding to the terminal device, wherein the common timing advance adjustment amount is a timing advance adjustment amount corresponding to a reference point; and sending, by the network device to the terminal device based on the correspondence between an index number and a value of the timing offset parameter, a second index number corresponding to the initial value of the timing offset parameter.

17. The method according to claim 15, wherein sending, by the network device, a common timing advance adjustment amount to the terminal device, wherein the common timing advance adjustment amount is a timing advance adjustment amount corresponding to a reference point.

18. A terminal device, comprising:

a processing module, configured to obtain a timing advance adjustment variation corresponding to the terminal device, wherein the timing advance adjustment variation is a difference between a timing advance adjustment amount currently used by the terminal device and a timing advance adjustment amount used at a previous moment, wherein the processing module is configured to determine whether an absolute value of the timing advance adjustment variation is greater than or equal to a first threshold; and a transceiver module, configured to: if the absolute value is greater than or equal to the first threshold, send first indication information to a network device, wherein the first indication information is used to indicate an update regularity of a timing offset parameter.

19. The terminal device according to claim 18, wherein the transceiver module is further configured to send the first indication information to the network device through a physical uplink control channel PUCCH; or the transceiver module is further configured to send the first indication information to the network device through a physical uplink shared channel PUSCH; or the transceiver module is further configured to send the MAC CE signaling to the network device, wherein the first indication information is carried in the MAC CE signaling.

20. The terminal device according to claim 18, wherein the update regularity is increasing a value of the timing offset parameter or decreasing a value of the timing offset parameter.

* * * * *